United States Patent [19]

Markle et al.

[11] Patent Number: 5,097,010

[45] Date of Patent: Mar. 17, 1992

[54] THERMALLY-REVERSIBLE ISOCYANATE POLYMERS

[75] Inventors: Richard A. Markle; Phyllis L. Brusky, both of Columbus; George E. Cremeans, Groveport, all of Ohio

[73] Assignee: Battelle Memorial Institute, Columbus, Ohio

[21] Appl. No.: 651,020

[22] Filed: Feb. 4, 1991

Related U.S. Application Data

[63] Continuation-in-part of Ser. No. 475,112, Feb. 5, 1990.

[51] Int. Cl.[5] ............... B29C 25/00; C08G 63/08
[52] U.S. Cl. ............................ 528/390; 528/44; 528/73; 525/195; 525/215; 525/304; 525/328.3; 525/420
[58] Field of Search ............... 528/44, 73, 390; 525/218, 195, 804, 328.3, 420

[56] References Cited

U.S. PATENT DOCUMENTS

| | | | |
|---|---|---|---|
| 2,777,831 | 1/1957 | Seeger et al. | 528/83 |
| 2,876,725 | 3/1959 | Buck et al. | 113/120 |
| 2,982,754 | 5/1961 | Sheffer et al. | 528/45 |
| 3,115,479 | 12/1963 | Windemuth et al. | 528/49 |
| 3,215,668 | 11/1965 | Bissinger et al. | 528/73 |
| 3,267,083 | 8/1966 | Imhof | 525/320.2 |
| 3,503,927 | 3/1970 | Chang et al. | 528/65 |
| 3,513,131 | 5/1970 | Marin et al. | 528/73 |
| 3,578,727 | 5/1971 | Battersby et al. | 528/45 |
| 3,591,562 | 7/1971 | Patton | 528/51 |
| 3,624,045 | 11/1971 | Stivers | 22/04 |
| 3,644,569 | 2/1972 | Pletsch et al. | 528/49 |
| 3,684,769 | 8/1972 | Abbott et al. | 22/12 |
| 3,734,896 | 5/1973 | Patton | 528/48 |
| 3,759,873 | 9/1973 | Hudak | 528/60 |
| 3,847,878 | 11/1974 | Hanson et al. | 528/73 |
| 3,888,964 | 6/1975 | Bain et al. | 528/390 |
| 3,933,758 | 1/1976 | Patton | 528/57 |
| 3,987,016 | 10/1976 | Haddad et al. | 528/374 |
| 4,046,749 | 9/1977 | Hauskins | 528/481 |
| 4,048,253 | 9/1977 | Ooba et al. | 525/440 |
| 4,064,086 | 12/1977 | Cowsar et al. | 528/73 |
| 4,064,107 | 12/1977 | Stackman et al. | 528/68 |
| 4,166,873 | 9/1979 | Gilliam et al. | 428/35 |
| 4,352,858 | 10/1982 | Stanley | 428/423.1 |
| 4,354,008 | 10/1982 | Skoultchi | 525/370 |
| 4,360,638 | 11/1982 | Bartman | 524/286 |
| 4,417,043 | 11/1983 | Coswell et al. | 528/176 |
| 4,423,182 | 12/1983 | Bartman | 524/367 |
| 4,471,106 | 9/1984 | Luecke et al. | 528/205 |
| 4,503,285 | 3/1985 | Darms et al. | 174/68.5 |
| 4,524,104 | 6/1985 | Nagio et al. | 428/341 |
| 4,539,384 | 9/1985 | Krishman et al. | 528/79 |
| 4,579,930 | 4/1986 | Kramer et al. | 528/71 |
| 4,608,418 | 8/1986 | Czerwinski et al. | 524/296 |
| 4,619,975 | 10/1986 | Matzner et al. | 525/437 |

(List continued on next page.)

FOREIGN PATENT DOCUMENTS

| | | |
|---|---|---|
| 0259968 | 3/1988 | European Pat. Off. |
| 2108137 | 5/1983 | United Kingdom |
| 2123841 | 7/1983 | United Kingdom |

OTHER PUBLICATIONS

Wagener, K. B. et al., "Thermally Reversible Urethanes", Polymer Preprints, vol. 30, No. 1 (Apr., 1989), pp. 287–288.

(List continued on next page.)

Primary Examiner—Maurice J. Welsh
Assistant Examiner—Duc Truong
Attorney, Agent, or Firm—Watkins, Dunbar & Pollick

[57] ABSTRACT

Thermally-reversible polymer compositions are obtained by reacting compounds with isocyanate and labile-hydrogen functionality. High-performance characteristics are incorporated into the polymer by using polyimide, aromatic polycarbonate, aromatic polyester, polyphenylene sulfide, and poly(parabanic acid) oligomers. Low-temperature flexibility and toughness are imparted to the polymers by using prepolymers such as polycaprolactone diols, polytetramethylene ether glycols and polyaliphatic carbon diols. Ionic bonding and liquid-crystal functionality may also be incorporated into the compositions. The compositions are useful as hot-melt adhesives, coatings, and moldings and in injection reaction molding applications and composite and laminate fabrication.

65 Claims, 5 Drawing Sheets

U.S. PATENT DOCUMENTS

| | | | |
|---|---|---|---|
| 4,176,223 | 11/1979 | Irwin | 528/170 |
| 4,201,853 | 5/1980 | Henry et al. | 528/85 |
| 4,205,150 | 5/1980 | Marubashi | 526/252 |
| 4,221,887 | 9/1980 | Brenner et al. | 525/332 |
| 4,289,813 | 9/1981 | Blomeyer et al. | 427/385.5 |
| 4,338,422 | 7/1986 | Jackson, Jr. et al. | 525/461 |
| 4,623,731 | 11/1986 | Ivanou et al. | 548/374 |
| 4,659,762 | 4/1989 | Jenkins | 524/331 |
| 4,659,789 | 4/1987 | Katto et al. | 525/537 |
| 4,668,744 | 5/1987 | Matzner et al. | 525/397 |
| 4,687,785 | 8/1987 | Parker et al. | 521/106 |
| 4,690,856 | 9/1987 | Ito et al. | 428/215 |
| 4,722,993 | 2/1988 | Hisgen et al. | 528/183 |
| 4,725,384 | 2/1988 | Du Vernet | 260/104 |
| 4,727,131 | 2/1988 | Kock et al. | 528/183 |
| 4,728,713 | 3/1988 | Hisgen et al. | 528/183 |
| 4,728,714 | 3/1988 | Hisgen et al. | 528/183 |
| 4,734,470 | 3/1988 | Kawabata et al. | 525/537 |
| 4,744,852 | 5/1988 | Augustin et al. | 156/327 |
| 4,748,229 | 5/1988 | Hisgen et al. | 528/183 |
| 4,769,424 | 9/1988 | Takekoshi et al. | 525/435 |
| 4,775,719 | 10/1988 | Markeuka et al. | 525/125 |
| 4,788,261 | 11/1988 | Taguchi et al. | 525/452 |
| 4,791,187 | 6/1988 | Suling et al. | 528/60 |
| 4,808,255 | 2/1989 | Markeuka et al. | 156/307.3 |
| 4,820,368 | 4/1989 | Markeuka et al. | 156/307.3 |
| 4,837,284 | 6/1989 | Matzner et al. | 525/437 |
| 4,851,278 | 7/1989 | Enanoza | 428/195 |
| 4,863,767 | 9/1989 | Garg et al. | 428/1 |
| 4,868,268 | 9/1989 | Muller et al. | 528/76 |
| 4,882,399 | 11/1989 | Tesuro et al. | 525/523 |
| 4,895,920 | 1/1990 | Mormann et al. | 528/76 |

OTHER PUBLICATIONS

Caraculacu, G. et al., "Poly(urethane-parabanic acid)s", Makromol. Chem., vol. 185, (1984), pp. 1079–1039.

Caraculacu, G. et al., "Copolymer of Poly(parabanic acid) and Polyimide", Journal of Polymer Science: Polyme Letters Edition, vol. 21, 277–280 (1983).

Patton, T. L., "Poly(iminoimidazolindinediones) and Poly(parabanic acids)", Polymer Reprints, vol. 12, No. 1, (Mar. 1971), pp. 162–169.

Daccord, G. et al., "α–ω–Difunctionalized Poly(p–thiophenylene) Oligomers", Polymer Bulletin (1981), pp. 459–466.

Koch, W. et al., "Models and Mechanisms of the Formation of Poly(thio–1,4–phenylene)", Makromol. Chem. vol. 184, (1983), pp. 779–793.

Lovell, P. et al., "Synthesis and Characterization of Poly(arylene sulfides)", Makromol. Chem., vol. 199, (1987), pp. 1561–1573.

Daccord, G. et al., "Oligo(thiophenylenes–1,4)α,–ω–difunctionnalises, 4", Makromol., vol. 184, pp. 1869–1876, (French with English Summary).

Daccord, G. et al., "Difunctional Poly(p–phenylene sulfide)oligomers, Polymer Bulletin, vol. 6 (1982), pp. 477–484.

Lovell, P. A. et al., "Synthesis and Characterization of Poly(arylene sulfides),7", Makromol. Chem., vol. 188, (1987), pp. 1551–1560.

Lovel, P. et al., "Synthesis and Characterization of Poly(arylene sulfides),6", Makromol. Chem., vol. 188 (1987), pp. 1537–1549.

Duda, A. et al., "Sulfur–Containing Polymers", in: Encyclopedia of Polymer Science and Engineering, vol. 16, (1989), pp. 246–368.

Sergeev, V. A. et al., "Sulfur–Containing Polymers", Vysokomol, Soedin, Ser. B, vol. 27, (1985), p. 740 (Russian: no translation).

Sergeev, V. A. et al., "Sulfur–Containing Polymers", Vysokomol, Soedin, Ser. B., vol. 29, (1987), p. 527 (Russian, no translation).

Annenkova, V. Z. et al., "Sulfur–Containing Polymers", Vysokomol, Soedin, Ser. B, vol. 27, (1985), p. 346 (Russian; no translation).

Garbarczyk, J., "Molecular and Crystal Structure of Bis(4–mercaptophenyl)Sulfide as a model compound for Poly(1,4–phenylenesulfide)", Makromol. Chem., vol. 187, (1986), pp. 2489–2495.

Daccord, G. et al., "Oligo(thiophenylenes–1,4)α,–ω–difonctionnalisés, 3", Makromol. Chem., vol. 184 (1983), pp. 1861–1867 (French with English Summary).

Sergeev, V. A. et al., "Synthesis and Properties of Sulfur–Containing Oligodiamines and Epoxy Polymers based on them", Vysokomol.

Soedin, Ser. A., vol. 25, No. 6, (1983), pp. 1311–1315 (Russian with Abstract Chemical Abstracts, vol. 99, No. 12, Abstract No. 89006w).

*Chemical Abstracts,* vol. 101, No. 10, Abstract No. 73274f, Japan Toshiba Corp., "Polysulfide–Polycarbonated", JP 59–4,621 A2.

(List continued on next page.)

OTHER PUBLICATIONS

Chemical Abstracts, vol. 102, No. 22, Abstract No. 185966k, Toray Industries, Inc., "Poly(phenylene sulfide) Compositions", Jpn. Kokai Tokkyo Koho, JP 59-204,657 A2, 20 Nov. 1984, Japan Patent Application.

Chemical Abstracts, vol. 99, No. 2, Abstract No. 6117; Koch, W. et al., "Models and Merchanism of the Formation of Poly(thio-1,4-phenylene)", Makromol. Chem. 184(4), 779-92, (1983).

Chemical Abstracts, vol. 84, No. 24, Abstract No. 165535a, Hawkins, R. T. "Chemistry of the Cure of Poly(p-phenylene-sulfide)", Macromolecules, vol. 9, No. 2, (1976), pp. 189-194.

Chemical Abstracts, vol. 78, No. 22, Abstract No. 136845x, Montaudo, G. et al., "Bridged Polyaromatics", Synthesis and Isomorphous Properties of Polymers and Oligomers containing Oxygen, Sulfur or Methylene Bridges", J. Polym. Sci., Polym. Chem. Ed., vol. 11, No. 1, (1973), pp. 65-79.

Chemical Abstracts, vol. 104, No. 18, Abstract No. 150209c, Liang, Y., "Thermoset Polymer Production", 115.4, 563, 509, Jan. 7, 1986.

Chemical Abstracts, vol. 102, No. 24, Abstracts No. 204835k, Wejchan-Judek, M. et al., "A New Method of Curing Poly(phenylene sulfide)", Polym. Degrad. Stab., vol. 11, No. 1, (1985), pp. 55-26.

Chemical Abstracts, vol. 108, No. 12, Abstract No. 95043b, Bizzari, C. et al, "Synthesis of Intramolecularly Cyclized Poly(phenylenesulfides) of the Thianthrene-type", J. Polym. Sci., Part A: Poly. Chem., vol. 26, No. 1, (1988), pp. 255-265.

Chemical Abstracts, vol. 91, No. 14, Abstract No. 158341a, Sergeev, V. A. et al., "Poly(acylene-sulfides)", U.S. 4,676,597; Jul. 30, 1979; USSR Patent.

Chemical Abstracts, vol. 99, No. 12, Abstract No. 89006w, Sergeev, V. A. et al., "Synthesis and Properties of Sulfur-Containing Oligodiamines and Epoxy Polymers Based on them", Vysokomol, Ser. A., vol. 25, No. 6, (1983), pp. 1311-1315.

Chemical Abstracts, vol. 67, 1967, Abstract No. 91314c, Dieterich, D. (Bayer), "Polyurethanes", GB 1,808,590; Aug. 23, 1967; British Patent.

Bruma, M. et al., "Ordered Polyesterimides", Revue Roumaine de Chimie, vol. 30, (1985), pp. 239-244.

Kaicheldorf, H. et al., "New Polymer Synthesis, 7: Synthesis and Characterization of Oligomeric and High Molecular Weight Poly(4-hydroxybenzoate)", Makromol. Chem., vol. 184, (1983), pp. 475-496 (p. 483 missing).

Derwent Abstract, JP63-161-020A; Jul. 4, 1988; Nippon Ester "Random Copolyester with Thermotropic Liquid Crystal Property—includes Units obtained from Aromatic Di-Tri-and Tetra-Carboxylic Acids, and Aromatic Phosphorus Compound", Japanese Patent Application.

*Chemical Abstract,* (unknown volume and abstract number), Cadiz, et al, Polymers Containing Titanium II", Rev. Plastic Mod., vol. 31, No. 236, (1976), pp. 193-202.

Chemical Abstract, vol. 85, No. 10, Abstract No. 63357x, Korshak, V. V. et al., "Polyester Imides with Regular Alternation of Ester and Imide Groups", Vopr. Fiz.-Khim. Polim., vol. 1, 1972, pp. 67-73.

Derwent Abstract, 89-009936/02, EP 298,884 A; Jan. 11, 1989, European Patent Application; Quentin, J. P., "Mouldable Thermotropic Copolyesteramide".

Derwent Abstract, 89-009935/02, EP 298,883 A; Jan. 11, 1989; European Patent Application, Quentin, J. P., "Thermotropic Aromatic Copolyesteramide".

Derwent Abstract, JP 58-091-818 A; May 31, 1983; Japan Patent Application; Asani Chemical, "Fiber or Film of Polyester containing Imide Group obtained by Melting Polyester Containing Imide Units; Extruding and Heat-Treating".

Derwent Abstract, DE 3,542,796 A; Jun. 11, 1987; W. Germany; Hisgen, B. et al., "Aromatic Mesomorphic Polyester-Amide-Imide(s)-from Diphthalimido-Diphenyl Compounds, Terephthalic and Isophthalic Acids, Amino-Phenols, Aminoacids Hydroxy-Benzoic Acid, etc".

Derwent Abstract, DE 3,542,798 A; Jun. 11, 1987; W. Germany; Hisgen, B. et al., "Aromatic Mesomorphic Polyesteramideimides-from Diphthalimido-Diphenyl Compounds Terephthalic and or Isophthalic Acids, Tertiary Butyl Hydroquinone, Aminophenols Aminocarboxylic Acids, etc.".

Derwent Abstract, EP 272-992 A; Jun. 29, 1989; European Patent Application; Quentin, J. P., "Shapable Thermotropic Aromatic Copolyesteramides Containing Units of a Substituted Hydroquinone, p-Aminobenzoic (List continued on next page.)

OTHER PUBLICATIONS

Acid, and Optionally other Aromatic Dicarboxylic Acids".

Derwent Abstracs, DE 3,542,813 A; Jun. 11, 1987; Kock, H. J. "Aromatic Mesomorphic Polyetheresters—from Hydroxy Benzoic Acid, Terephthalic Acid, Di(-p-hydroxyphenoxy)phenyl Sulphone, Tertiary Butyl Hydroquinone".

Derwent Abstracts, DE 3,542,778 A; Jun. 11, 1987; Portugal, A., "Aromatic Mesomorphic Polyesteresters—from Hydroxy Benzoic, Terephthalic Acid, Hydroquinone, Dihydroxy Diphenyl and Di(p—hydroxyphenoxy)phenyl Sulphone".

Derwent Abstracts; EP 213899 A; Mar. 11, 1987; Nippon Oil, "Cholesteric Liquid Crystal Polyester—containing Units of Cyclohexane Dicarboxylic Acid, 3—methyl Adipic Acid and optionally substituted Hydroquinone".

Chattopadyay, K. B. et al., "Synthesis and Characterization of Novel Polyurethane Cationomer", Polymer Communication, vol. 30, No. 1, (Jan. 1990), unknown.

Ding, Y. S. et al., "Synthesis and Characterization of Sulphonated Polyurethane Ionomers Based on Toluene Diisocyanate", Polymer, vol. 30, (Jul. 1989), pp. 1204-1211.

Lee, D. et al., "Methylenebis(p-phenyl isocyanate)—based Polyurethane Ionomers, I. New Small Angle X-Ray Scattering Model", Macromolecules, vol. 21 (1988), pp. 998-1004.

Bazuln, C. "Modification of Polymer Properties Through Ion Incorporation", Ind. Eng. Chem. Prod. Res. Dev., vol. 20, (1982), pp. 271-286.

MacKnight, W. J. et al., "Elastic Ionomers", Rubber Chemistry and Technology, vol. 57, pp. 652-663.

Longworth, R., "Thermoplastic Ionic Polymers: Ionomers", In: Holliday, L. Ionic Polymers, (1975), Chpt. 2, pp. 69-170 (partial copy).

Phillips, P. J., "Some Electron Microscopical Investigations of Inomomeric Materials", Polymer Letters, vol. 10, (1972), pp. 443-447 (partial copy).

Phillips, P. J., "Mechanical Nical and Thermal Properties of Phosphorylated Polyethylene", Polymer Letters, vol. 8, (1970), pp. 87-94.

Dieterich, Von. D. et al., "Polyurethan-Ionomere, Eine Nelle Klasse Von Sequenzpolymeren", Angewandete Chemie, vol. 82, No. 2, (1970), (53-57 only; German).

Dieterich, D. et al., "Polyurethane Ionomers, A New Class of Block Polymers", Angew. Chem. Internat. Edit., vol. 9, (1970), pp. 40-50.

Phillips, P. J. et al., "Structure and Properties of Polyethylene Modified with Phosphonic Acid Side Groups. I. Mechanical and Thermal Studies".

Thermal Studies of Polyethylene, vol. 3, No. 6, (Nov.—Dec. 1970), pp. 767-771.

Eisenbert, A., Ions in Polymers, Advances in Chemistry Series 187, includes portions of the following chapters:

Makowski, H. S. et al., "Synthesis and Properties of Sulfonated EDPM", Chpt. 1, pp. 3-19 (partial copy).

Lundberg, R. D. et al., "A Comparison of Sulfonate and Carboxylate Ionomers", Chpt. 2, pp. 21-36 (partial copy).

Makowski, H. S. et al., "Plasticization of Metal Sulfonate-containing EPDM with Stearic Acid Derivatives", Chpt. 3, pp. 37-51 (partial copy).

Brenner, D. et al., "Effect Counterion Structure on Ionomer Properties: Quaternary Phosphonium Countarions in Sulfonated EPDM", Chpt. 4, pp. 53-66 (partial copy).

Lundberg, R. D., "The Dual Plasticization of Sulfonated Polystyrene Ionomer", Chpt. 5, pp. 67-76 (partial copy).

Rahrig, D., "Thermal and Dynamic Mechanical Properties of Sulfonated Polypentenamers", Chpt. 6, pp. 77-89 (partial copy).

Noonan, D., "Thermally and Dynamic Mechanical Properties of Sulfonated Polyentenamers", Chpt. 6, pp. 77-89 (partial copy).

Chemical Abstracts, vol. 65, No. 17, Abstract No. 17170c, Netherlands Patent Application 6,515,558, Bayer AG, "Anion Forming Polyurethanes", NL 65 15,558; Jun. 7, 1966.

Chemical Abstracts, vol. 63, Abstract No. 5868a, Bayer AG, "Polyurethane Latexes Containing Water and Free of Emulsifying Agents", 1965, NL 64 10,928, Mar. 29, 1965, Netherlands Patent Application.

Chemical Abstracts, vol. 55, Abstract No. 2184d, Thoma et al. (Bayer AG), "Water-Soluble Polyureas", DE 1,042,892; Nov. 6, 1958; German Patent.

Chemical Abstract, vol. 55, Abstract No. 10912f, Thoma et al. (Bayer AG), "Soluble Polyureas for Tex- (List continued on next page.)

OTHER PUBLICATIONS tile Treatment and Pharmaceutical Use", DE 1,067,212; Oct. 15, 1959; German Patent.

Chemical Abstracts, vol. 77, p. 63, Abstract No. 141337s, Garforth, J. D., "Fiber-Forming Polyamides Having Improved Affinity for Basic Dyes", U.S. Pat. No. 3,682,866 (Aug. 8, 1972).

Chemical Abstracts, vol. 74, p. 33, Abstract No. 126517v, Heiberger, P., "Aqueous Dispersion of Copolyesters Modified with a Sulfonated Aromatic Compound", U.S. Pat. No. 3,563,942 (Feb. 16, 1971).

Chemical Abstracts, 1962, Abstract No. 8762g, Griffing, J. M. et al., "Sulfonate Containing Polyesters Dyeable with Basic Dyes", U.S. Pat. No. 3,018,272 (Jan. 23, 1962).

Chemical Abstracts, vol. 83, p. 494, Abstract No. 186380r, Arcest, J. A. et al., "Photographic Product Using Photosensitive Polymers for Lithographic Use", Belgium Patent 819,906.

Harris, F. W., "Synthesis of Aromatics Polyimides from Dianhydrides and Diamines", In: Hergenrother, P. M., Recent Advances in Polyimides and Other High Performance Polymers, Jan. 22–25 (1990) (partial copy).

Botwell, M. "Adhesives Overseas, Bostik European Focuses on Reactive Hot Melts", Adhesive Age, Sep. 1987, pp. 42–43.

Endo, H. et al., "Peel Adhesion of the Reaction Type Blend of Saponified Ethylene-Vinyl Acetate Copolymer and Polyurethane", Osaka-Furitsu Kigyo Gijutsukenkyusho Hokoku, vol. 88, (1986), pp. 26–30 (Japanese; No Translation), Chemical Abstract, vol. 106, No. 22, Abstract No. 177390k.

Frisch, K. C. et al., "Formulating Polurethane-Adhesives and Sealants", Adhesives Age (Sep. 1988), pp. 41–54.

Frisch, K. C. et al., "Applications for Polyurethanes: Adhesives, Sealants, Binders", Adhesive Age, (Oct. 1988), pp. 227–229.

Kimball, M. E., "Reactive Hot-Melt Adhesive and Sealants", Society of Manufacturing Engineers, Paper No. A088-635 (1988).

High Temperature Polymers and Their Uses, Society of Plastics Engineers, Oct. 2–4, 1989.

Hespe, H. F., "Polyurethanes (Pur)", In: Engineered Materials Handbook, Engineering Plastics, vol. 2, 1988, pp. 257–264.

Wicks, Jr., Z. W., "Blocked Isocyanates", In: Progress in Organic Coatings, 3(1975), pp. 73–99.

Wicks, Jr., Z. W., "New Developments in the Field of Blocked Isocyanates", In: Process in Organic Coatings, 9(1981), pp. 3–28.

Anagnostou, T. et al., "Synthesis of Blocked MDI Adducts, Their DSC Evaluation and Effect of Pigmentation", Journal of Coatings Technology, vol. 53, No. 673, Feb. 1981, pp. 35–45.

THERMALLY-REVERSIBLE ISOCYANATE POLYMERS

This is a continuation-in-part of our prior application Ser. No. 07/475,112 filed Feb. 5, 1990.

FIELD OF THE INVENTION

This invention relates generally to polymer compositions that are found by reacting isocyanate and labile-hydrogen functionality. More particular the invention relates to thermally reversible polymer compositions that are capable of thermally dissociating into the reactant isocyanate and labile hydrogen. Such thermally-reversible isocyanate-based polymer compositions are useful, among other things, as coatings, hot-melt adhesives, moldings, in reaction injection molding applications and in composite or laminate fabrication.

BACKGROUND OF THE INVENTION

Organic polyisocyanates have been used as lacquers, films, coatings and hot-melt adhesives. Since isocyanate compounds are very reactive toward groups with an active hydrogen such as hydroxyl, carboxyl, amine and the like, it is common to control such reactivity by adding a mono-blocking or masking agent to the isocyanate (U.S. Pat. No. 3,115,479 to Windermuth et al.) and then reacting the blocked isocyanate with a polyester containing free hydroxyl groups by heating the mixture to deblock the isocyanate.

As seen in U.S. Pat. No. 2,777,881, it is possible to avoid the use of blocking agents by limiting the amount of isocyanate reacted with terminal labile hydrogen groups of a polyester or polyesteramide so as to afford a material that is in an uncured state. Additional isocyanate groups then are added to the uncured product so that a subsequent irreversible cross-linking reaction with moisture can take place to produce the final cured state with appropriate physical properties.

Another solution that avoids premature introduction of moisture into the product is to use a packaging system to protect the isocyanate from moisture prior to use. *Adhesives Age*, September 1987, p. 42-43.

U.S. Pat. No. 4,166,873 to Gilliam et al discloses improved hot melt adhesives and coatings formed by adding diisocyanate to polyesters. The inventors note that the incorporation of isocyanate into the polyester molecules does not involve chain-extension or significant cross-linking. U.S. Pat. No. 2,982,754 to Sheffer et al. and U.S. Pat. No. 2,876,725 to Buck at al. (example 4) contain additional examples of polyesters modified by the addition of isocyanates.

U.S. Pat. No. 3,684,769 to Abbott et al. pertains to thermally reversible polyester or polyether urethane polymers with thermally reversible urethane links between polymer chains. U.S. Pat. No. 4,201,853 to Henry et al reveals a thermally-reversible polymeric binder for plastic bonded explosives that reversibly dissociated below 150° C. Wagener and Muria, *Polymer Preprints*, Vol. 30, No. 1, April 1989 disclose monomeric thermally reversible urethanes whose molecular weight is a function of temperature. Although a polyurethane was prepared, no discussion or data on polymer urethane bond reversibility are given nor are suggestions made as to its applicability.

U.S. Pat. No. 4,608,418 to Czerwinski et al. illustrates an attempt to improve the performance of conventional isocyanate materials by adding a reactive plasticizer to a hot-melt composition formed from a mixture of one or more polyisocyanates and one or more hydroxyl terminated polyols and one or more chain extenders.

Prior-art isocyanate-based polymers have been low molecular weight isocyanate compositions that afford good working properties, e.g., application ease, surface wettability and penetration, leveling ability, and gap-filling capacity. Such materials are commonly moisture-cured to form substituted polyureas after being applied to give durable coating or adhesive materials. However, such materials do not have the high performance characteristics of some of the more costly high-performance polymers such as the polyimides. Typically as one attempts to improve the performance characteristics of the isocyanate-based materials using conventional techniques, high-viscosity and associated low wettability result in a loss of substrate bonding ability. Currently conventional isocyanate polymers do not allow for the high temperature processing, e.g., soldering and thermoforming, of flexible circuit boards and other components such as chips, transformers and motors. Conventional isocyanate polymers typically do not provide cracking resistance at high end-use operating temperatures such as found in high performance aircraft, automotive and computer equipment. The processibility of high performance materials such as polyimides that are used in high performance protective dielectric film or coating materials is more limited than desired. A need continues to exist for a better, melt-processible, high-performance material such as a polyimide for molding applications.

SUMMARY OF THE INVENTION

This invention meets these needs and solves many of these problems by preparing thermally-reversible polymer compositions that contain isocyanate-labile-hydrogen based linkages in the polymer backbone and, if necessary, a controlled number of similar crosslinking groups. These isocyanate-labile hydrogen based linkages provide cured, crosslinked, three-dimensional polymer networks that are insoluble, strong solids, at room temperature, but which become soluble, free-flowing melts at elevated temperatures. The polymers become soluble and fusible due to a thermally reversible dissociation of the isocyanate-labile hydrogen based linkage to the isocyanate and labile-hydrogen starting groups at an elevated temperature.

The isocyanate-labile hydrogen based linkage is a urethane linkage when isocyanate functionality reacts with a terminal hydroxyl functionality. A substituted urea linkage is formed when the labile hydrogen functionality is a terminal amine functionality. Other labile-hydrogen functionalities form an isocyanate adduct of the functionality. Labile-hydrogen functionalities include, but are not limited to, amides, alcohols (including phenols), amines, oximes, triazoles, imidazoles, imidazolines and iminodiazolidinediones.

Generally both aromatic and aliphatic isocyanate and labile-hydrogen functionality form urethane or other bonds that are reversible at some elevated temperature. Typically this temperature is significantly higher for the aliphatic product than for the aromatic product. Intermediate reversing temperatures can be achieved by using a mixed aliphatic and aromatic product. When high performance polymers are desired, an isocyanate containing a poly(parabanic acid) linkage may be used.

Often it is desireable to block the isocyanate functionality prior to its reaction with the labile hydrogen functionality so as to prevent unwanted irreversible reactions with moisture and other reactive hydrogen contaminants. As a result, improved handling and stability of the isocyanate functionality is obtained. By using a volatile blocking agent such as phenol, the blocked isocyanate can be reacted with the labile hydrogen functionality by heating the two reactants so as unblock the isocyanate by vaporizing the phenol leaving the unblocked isocyanate to react with the labile hydrogen functionality.

By controlling the stoichiometry of the reactant labile-hydrogen functionality and the isocyanate functionality, it is possible to obtain a polymer with isocyanate end groups. By using a nonvolatile blocking group in the correct stoichiometry, it is possible to control the reactivity and characteristics of the final polymer product. Provided there are no interfering reactions with the nonvolatile blocking group, it may be added at any stage of the reaction sequence.

Various characteristics may be incorporated into the polymer composition by using oligomers with specific properties. For example, aromatic polycarbonates may be used to provide inherent toughness and impact resistance. By controlling the degree of polymerization of an aromatic polyester oligomer, a melt liquid crystal property can be obtained. Such a liquid crystal property provides solid state anchoring or "virtual crosslinks" so as to minimize the number of actual three dimensional covalent crosslinks that need to be used. Polyimides are used to provide high melting and liquid crystal features. Polyphenylene sulfides have exceptional strength and rigid, heat stable polymer chains that provide improved hardness, toughness, and solvent resistance to the polymer composition. Although hydroxyl end groups are preferably used as the active or labile-hydrogen end groups, other end groups such as amines, oximes, triazoles, imidazoles and imidazolines may also be used.

To provide ambient or low temperature flexibility and toughness, flexible aliphatic polyester, polyether or polycarbonate prepolymers can be included in the polymer composition. For example, polyesters formed from adipic or sebacic acid, dimer acids, $\alpha,\omega$-butane, pentane or hexane diols, hydrogenated (saturated) phthalic acids, other simple diols and polyglycols such as polypropylene glycols can be used.

Melt reversibility is enhanced by incorporating ionic functionality into the polymer composition that is capable of forming thermally-reversible ionic bonds. Typically such thermally-reversible ionic functionality can be achieved by using a functionality such as an aliphatic carboxylate, sulfonate, or phosphonate that is capable of forming ionic bonds with preferably a multivalent cation such as zinc, magnesium, calcium or nickel.

BRIEF DESCRIPTION OF THE DRAWINGS

FIG. 1 shows data from $-50°$ C. to $100°$ C. for composition H-a after about 10 minutes mixing at $200°-210°$ C.

FIG. 2 shows data from $100°$ C. to $200°$ C. for composition H-a after about 10 minutes mixing at $200°-210°$ C.

FIG. 3 shows data from $100°$ C. to $220°$ C. for composition H-b (tin catalyst added) after about 10 minutes mixing at $200°-210°$ C.

FIG. 4 shows data from $100°$ C. to $220°$ C. for composition J after 25 minutes mixing at $200°-210°$ C.

FIG. 5 shows data from $100°$ C. to $220°$ C. for composition J after 75 minutes mixing at $200°-210°$ C.

Figure 1:
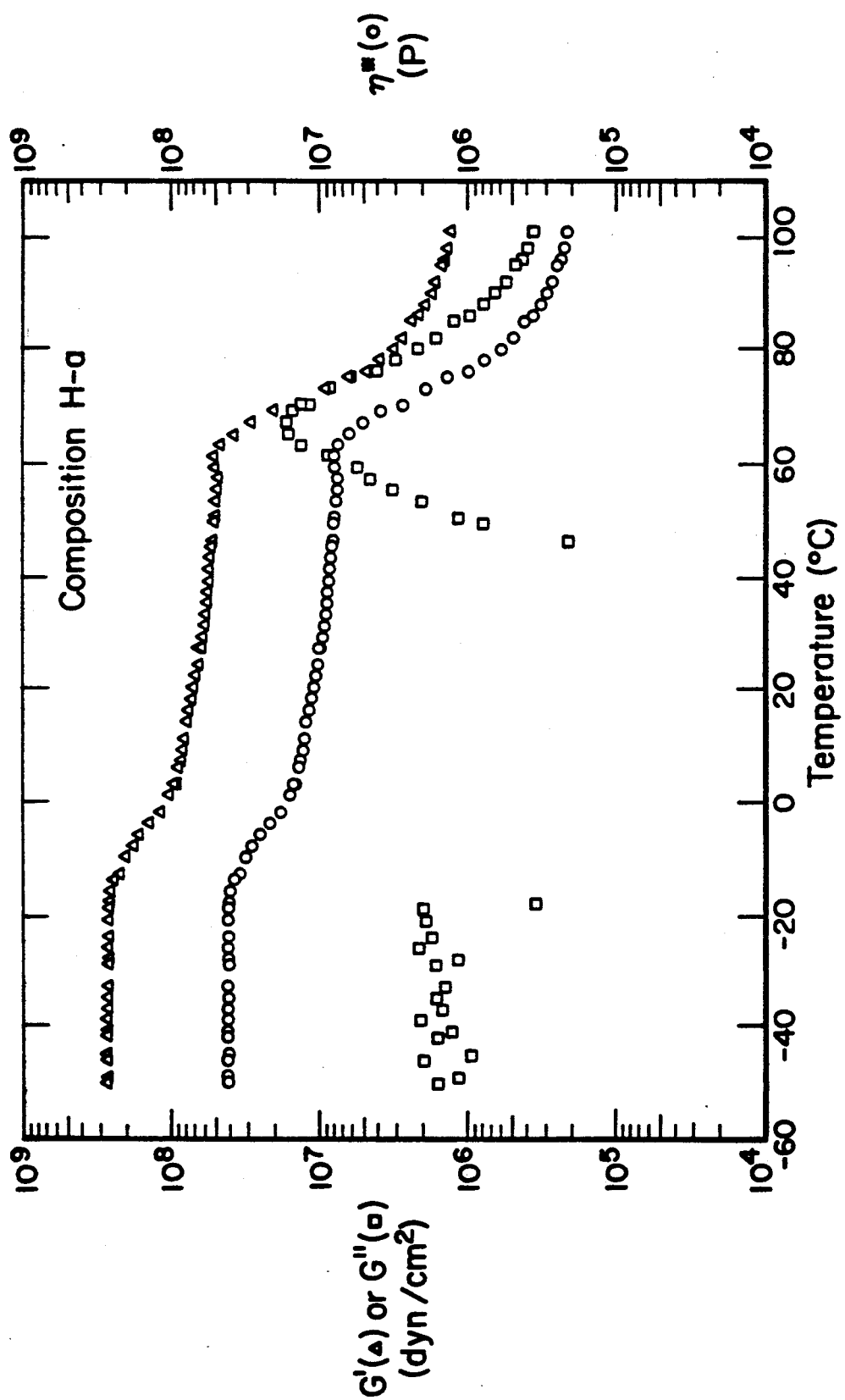
FIGS. 1-5 are Rheometric plots of the dynamic viscosity $\eta^*$, in poise, the storage shear modulus $G'$, and the loss shear modulus $G''$ determined as a function of temperature (oscillation mode) using a Rheometrics Dynamic Mechanical Spectrometer RMS 605.

DETAILED DESCRIPTION OF THE INVENTION AND BEST MODE FOR CARRYING OUT THE PREFERRED EMBODIMENT

The benefits and potential benefits of the thermally-reversible polymer composition arise from the basic property of this invention, that is, the ability of the polymer composition to thermally dissociate into its reactant isocyanate and labile-hydrogen functionalities. This basic property allows the composition to flow at a comparatively low temperature while exhibiting high strength, good surface adhesion, low temperature flexibility, relatively fast development of strength, relatively good solvent resistance, good tear resistance, good impact resistance, and high abrasion resistance.

Generally the formation of the compositions of this invention requires reacting high performance oligomers possessing appropriate reactive end groups, i.e., isocyanate and labile-hydrogen functionality capable of forming a isocyanate-labile hydrogen based linkage that is capable of thermal dissociation into the starting materials. Essentially stoichiometric amounts of isocyanate and labile-hydrogen functionality are used.

Two types of structures are prepared. One consists of linear isocyanate-labile hydrogen based linkage in which no trifunctional isocyanates (or labile-hydrogens) are used. Such polymeric compositions have "virtual crosslinks," i.e., crystalline aggregates that act like crosslink sites, based on liquid crystal oligomers. The second type of polymeric composition is a crosslinked isocyanate-labile hydrogen based linkage based on a combination of a diisocyanate-labile hydrogen linear linkage and preferably a component of triisocyanate or a tris-labile hydrogen or both. Both types of structures may also contain ionic functionality capable of forming thermally-reversible ionic bonds.

The thermally-reversible polymer compositions may also be considered as having three building blocks: 1) an isocyanate linking group, 2) a high performance aromatic oligomer backbone group, and 3) a toughening aliphatic prepolymer backbone group.

The isocyanate linking group includes the trifunctional isocyanate crosslinker that is preferably reacted only with the aromatic oligomer backbone group. Various balanced stoichiometry combinations of these three sequences can be combined to produce thermally-reversible polymer compositions that are crosslinked to a controlled extent with aromatic isocyanate-labile hydrogen linkages, or are not covalently crosslinked, but depend on "virtual" crystalline polymer crosslinks for high performance.

Although phenolic hydroxyl is preferably used as the labile-hydrogen functionality, it is noted that other moieties also furnish labile-hydrogen functionality. Such moieties include, but are not limited to, aromatic amines or diamines, aromatic oximes and bis-, bi-, or dioximes, aromatic triazoles and bis- or ditriazoles, and aromatic imidazoles and imidazolines and bis- or diimidazoles and imidazolines. Less preferred are the aliphatic analogs of these compounds and primary amines where excessive cross linking may be undesirable.

Polyisocyanate reactants used in this invention include aromatic, aliphatic, cycloaliphatic or aralkyl polyisocyanates containing from about 6 to 100 carbon atoms. When a linear composition is sought, the polyisocyanate functionality should be about 2. The following polyisocyanates are expected to be useful: 1) aromatic isocyanates and prepolymers based on the following materials: 4,4'-diphenyl methane diisocyanate (MDI), 4,4',4"-triphenyl methane triisocyanate, 1,4-phenylene, diisocyanate (DPDI), 1,3-phenylene diisocyanate, xylene diisocyanates such as 5,6-dimethyl-1,3-phenylenediisocyanate and 2,4-dimethyl-1,3-phenylenediisocyanate and other aromatic isocyanates based on other backbones such as naphthalene and 2) aliphatic isocyanates and prepolymers based on the following representative materials: 1,3-cyclohexylene diisocyanate, 4,4'-methylene-bis(cyclohexylisocyanate). A wide variety of polyisocyanates are known in the art as shown in, for example, U.S. Pat. No. 4,608,418 to Czerwinski et al., which is hereby incorporated herein by reference.

The high-performance oligomer backbone group includes, but is not limited to, polycarbonates, aromatic polyesters, polyimides, poly(parabanic acids), and polyphenylenesulfides with phenolic hydroxyl or other labile-hydrogen end-group functionalities. Generally a labile-hydrogen functionality of about two is preferred.

The polycarbonates can be prepared from bisphenol A and phosgene in a suitable organic solvent using a controlled excess of bisphenol A to produce phenolic hydroxyl end groups. Suitable polycarbonates include those based on or containing in addition to bisphenol A, bisphenol F, 4,4'-dihydroxybenzophenone, 4,4'-dihydroxydiphenylsulfone, hydroquinone, resorcinol, phenolphthalein or 4,4'-biphenol.

Aromatic polyester oligomers are based, for example, on 4- and 3- hydroxybenzoic acid, hydroquinone, resorcinol, 4,4'-biphenol, terephthalic acid, isophthalic acid and the 1,5-disubstituted naphthalenes, in which both groups are either hydroxyl or carboxyl, or one is hydroxyl and the other is carboxyl. The phenol (aromatic hydroxyl) groups are present in the reaction mixture, for example, a melt, predominantly in the form of the acetate ester obtained by reaction with acetic anhydride. Generally about half of the oligomer will contain 4-hydroxybenzoic acid derived moieties. The remainder can be derived from any of the other monomers, so long as the reaction mixture composition is such that the acetoxy and hydroxy to carboxylic acid group ratio will result in a hydroxy-terminated oligomer with a degree of polymerization in the range of 1-20 and more preferably in the range of 1-10. Further the monomer mixture must be selected so that the oligomer will be obtainable as a melt under an inert atmosphere such as nitrogen or argon at temperatures that can be varied between about 200° C. and an upper temperature at which essentially no thermal degradation occurs, i.e., about 300° C. or above.

Illustrative of the polyimides are those based on pyromellitic dianhydride (PMDA) and other commercially available aromatic dianhydrides and aromatic diamines such as p-phenylenediamine, 4,4'-diaminodiphenylether and benzidine. Additional, nonpara-substituted diamines such as m-phenylenediamine and 3,3'-diaminodiphenylether may also be used to lower the melting point of the oligomer.

Poly(parabanic acids) and their preparation are described in U.S. Pat. No. 3.933,758 to Patton which is hereby incorporated herein by reference. Isocyanates based on p-phenylenediisocyanate, MDI, and the other isocyanates listed above and in the Patton patent are reacted with hydrogen cyanide using an excess of isocyanate to provide first stage isocyanate-terminated oligomers of a controlled degree of polymerization (DP). The isocyanate terminated oligomer can then be blocked with phenol or reacted with any of a number of phenolic hydroxyl terminated oligomers. The iminoimidazolidinedione ring(s) in the blocked or reacted oligomer can be hydrolyzed under appropriate conditions with a properly, water-diluted, mineral acid such as sulfuric acid to provide the parabanic acid ring oxygen and the ammonium salt of the mineral acid.

Illustrative polyphenylenesulfides suitable for the practice of this invention can be prepared by the condensation of p-dichloro or p-dibromobenzene with sodium sulfide using p-chloro or bromo phenol to control the molecular weight of the oligomer and to provide hydroxyl end groups. Limited amounts of m-diholobenzene may be used to control the processability of the oligomers.

Toughening prepolymers provide ambient or low temperature flexibility and toughness to the final polymer composition. A wide variety of flexible prepolymer materials may be used including polycaprolatone diols such as Union Carbide PCP, polytetramethylene ether glycols such as Du Pont Teracol and polyaliphatic carbonate diols such as PPG Duracarb. Other toughening prepolymers include hydroxy-ended aliphatic polyesters such as adipic acid or sebacic acid polyesters with $\alpha,\omega$,-butane, pentane or hexane diols, saturated phthalic acid-based polyesters (long, or non-drying alkyds) with any of the simple diols and simple polyether glycols such as polypropylene glycols.

Additives as are commonly added to polyurethane products such as antioxidants, UV stabilizers, colorants, fillers, etc., can be added to the polymer composition of the present invention in conventional amounts.

The polymer composition of this invention can be coated onto a suitable substrate by applying such composition to the substrate and then heating the covered substrate to a temperature sufficient to form a bond. Operative methods for covering a surface include powder coating and applying a film to the substrate. In powder coating, the composition is ground into a powder with particle sizes less than about 250 microns and applied to a substrate either by electrostatic spray or by fluidized bed. The covered substrate then can be baked at a temperature sufficient to form a uniform fused coating bonded to the substrate. In another method, a film of the polymer material can be placed on the substrate and then baked. Alternatively, the thermally reversible material can be applied to a heated substrate such that bonding occurs as the material is applied to the substrate. When used as a hot melt adhesive, the polymer composition can be applied between two substrates and the two substrates heated to form a bond. Alternatively the polymer composition can be applied to at least one heated substrate followed by pressing the second substrate to the first. When thermal conductivity is not a significant factor, the heated polymer components can be applied without substrate heating.

One of the objects of this invention was to prepare polyurethane polymer compositions based on aromatic diisocyanates that provide a good balance of easy melt processibility, especially at higher temperatures where aromatic urethane bond reversibility occurs, and excellent physical properties over a broad temperature range. For example, it was desired to obtain good adhesive strength at temperatures of 120°-150° C. or higher. Aromatic ester and polycarbonate diol oligomers that melt at temperatures ≧180° C. and have the potential to provide such properties have been designed and synthesized.

Polycarbonate oligomers were prepared and are represented by the acronym sequence DP1-C-[DP2-C]$_n$DP1 where DP1 is an aromatic diphenol, C is carbonate functionality, DP2 is selected from the group of diphenols consisting of aromatic diphenols that may be the same as DP1 and aromatic-aliphatic diphenols and wherein C is carbonate functionality derived from a carbonyl and the oxygen moiety on seperate phenol units of DP1 and DP2 and n is about 1-20.

Phenolic hydroxy terminated polyesters of aromatic or aliphtic esters were prepared and are represented by the acronym sequence PH-[DHA-DAH]$_n$-DHA-PH where PH is a phenolic acid ester segment, DHA is an aromatic or aliphatic dihydroxy or di acid ester group or a mixed hydroxy and acid ester segment, HDA is an aromatic diacid ester or dihydroxy or mixed hydroxy and acid ester segment selected so that DHA and DAH combine to be linked by an ester functionality, PH combines with the terminal group of the DHA-DAH sequence to form an ester functionality and n is about 1-20. It is to be understood that various combinations of reactants can be used to obtain the ester functionality such as the reaction of an acid with a hydroxy group and that such combinations are considered as equivalents to the above described sequence.

Preparation of the bis-hydroquinone ester of isophthalic acid (HQ/IPA/HQ) and a polycarbonate (PC) oligomer are described in the attached experimental procedures. The aromatic ester oligomers were designed to provide strength, stiffness (high modulus) and temperature resistance. The polycarbonate oligomers were designed to provide strength and broad temperature range toughness. The differential scanning calorimetry (DSC) melting points of the oligomers are summarized in Table 1.

To further moderate flexibility and toughness, especially at low temperature, low melting aliphatic polyester polyols were utilized. Finally crosslinking was introduced by selective incorporation of aromatic triisocyanates or aliphatic triols. The latter would function by providing internal aromatic triisocyanate production. The aromatic urethane crosslinks were designed to provide enhanced strength, resistance to creep under stress and solvent/chemical resistance. Yet at elevated temperatures, these bonds reverse allowing the composition to be more readily melt processed. Overall compositions with relatively low melt viscosity at high temperature (e.g., 500-10,000 poise at 200° C.) and excellent or superior strength, toughness and solvent resistance at lower temperatures (from about −40° C. to about 120° C.) are provided.

These polymers are useful as hot melt adhesives, coatings, melt processible polymers for part fabrication (injection, transfer, other thermoplastic processes), composite fabrication by melt impregnation, prepregging followed by thermal forming, pultrusion, and so on.

Adhesive component materials and their equivalent weights are listed in Table 2. Adhesive samples were hand mixed by adding the polyol components to a 180 cc electrolytic (deep) beaker and melting/stirring under an argon flush using a Wood's metal bath set at 180° to 220° C. (Table 3). The preparation of composition C (Example 9) is described as an example for all preparations. The melt mixing was done at ~180° C. when no polycarbonate oligomer (Example 6, degree of polymerization (DP9), bisphenol A/phosgene oligomer with phenol end groups) was used. However, the mix had to be heated to ~210° C. to comelt the polycarbonate oligomer. A stainless steel spatula was used. Once comelted, all the polyol mixtures were clear, easily stirred melts.

The resulting melts were then cooled to about 100° C. and the isocyanate components added, then the mixture heated to higher temperatures, e.g., 150°-210° C. as needed, to provide a melt with acceptable viscosity. The amount of isocyanate was adjusted so that the equivalents of OH and NCO groups were essentially equal in each case. Hence high molecular weight mixed aliphatic-aromatic polyurethanes were formed on completion of reaction between the OH and NCO groups. An end capper (p-phenyl phenol) that is relatively nonvolatile (b.p. >300° C.) was added in the range of 0.1 to 0.05 equivalents to limit linear polyurethane molecular weight to ~100,000±50,000 and provide stabilized, nonfunctional polymer chain ends.

In some cases (Compositions A-E; Table 3), only linear polymers were expected since only difunctional polymer building units were used. In the remaining compositions (F-K), trifunctional aromatic isocyanates (CB75) or a triol (TMP) that results in in-situ aromatic triisocyanate formation were used. Hence these compositions are crosslinked below their melting points. Therefore the actual molecular weights depend on the purity and the degree of difunctionality of the difunctional components, the extent of end capping by p-phenyl phenol, the degree of crosslinking, and the degree of dissociation (or reversal) of the urethane bonds. The last two factors depend greatly on the temperature.

The thermal transitions for the compositions were determined by differential scanning calorimetry (DSC). These data are listed in Table 4. All the compositions have a second order (glass) transition temperature at ~44°-49° C. They show very broad melting transitions starting at temperatures ranging from as low as about 135° C. to about 181° C. They all show complete melting between about 192° C. and 227° C.

The compositions containing crosslinkers (samples F-K) show a moderate shift upward in initial melting point (~10°-25° C.). When a tin catalyst (dibutyl tin dilaurate, 0.1 weight percent) is added to a composition, a further modest increase in initial melting point (~30 degrees, composition H-b vs H-a) is observed. Clearly the compositions containing crosslinking groups are thermally reversed to the noncrosslinked state above their melting temperatures.

At ambient temperature, compositions A-E are readily soluble in N-methyl pyrrolidone (NMP). Composition F (1 equivalent percent isocyanate crosslinker) showed very slight evidence of crosslinking (very small amount of highly swollen gel in NMP). Compositions G-K (~10 equivalent percent isocyanate crosslinking groups) did not dissolve in NMP. Rather a slightly to moderately swollen gel was observed in NMP. Hence these compositions are rather thoroughly crosslinked at this temperature. The gels swelled considerably more upon heating to 100° C. but still did not dissolve. At ~120°-130° C., the gels began to break up and solubilize.

The dynamic (oscillatory) rheologic response of selected compositions was determined using the Rheometrics Dynamic Mechanical Spectrometer RMS 605. The dynamic viscosity (R) or $\eta^*$ (poise), the loss shear modulus G" [dyne/cm$^2$] and the storage modulus G' [dyne/cm$^2$] were determined as a function of temperature. The viscosity and storage shear modulus should be greater than about 10$^6$ for useful physical strength to be observed. The viscosity should be less than about 10,000 poise for reasonable melt processibility. Hot melt adhesive application is best in the 5-500 poise range. The most desirable viscosity will depend on several factors including, but not limited to, the method of hot melt application, the nature of the surfaces to be bonded, and their temperatures.

Composition H (actually H-a) and its replicate (J) exhibit these characteristics well and show excellent adhesive properties (described below). The rheometrics curves for H-a (FIG. 2) and H-b (FIG. 3; with a tin catalyst) were measured after about 10 minutes mixing at about 200°-210° C. Composition J (H-a replicate) was measured after mixing 25 and 75 minutes at 220° C. The rheometric plots are shown in FIGS. 1-5.

Figure 2:
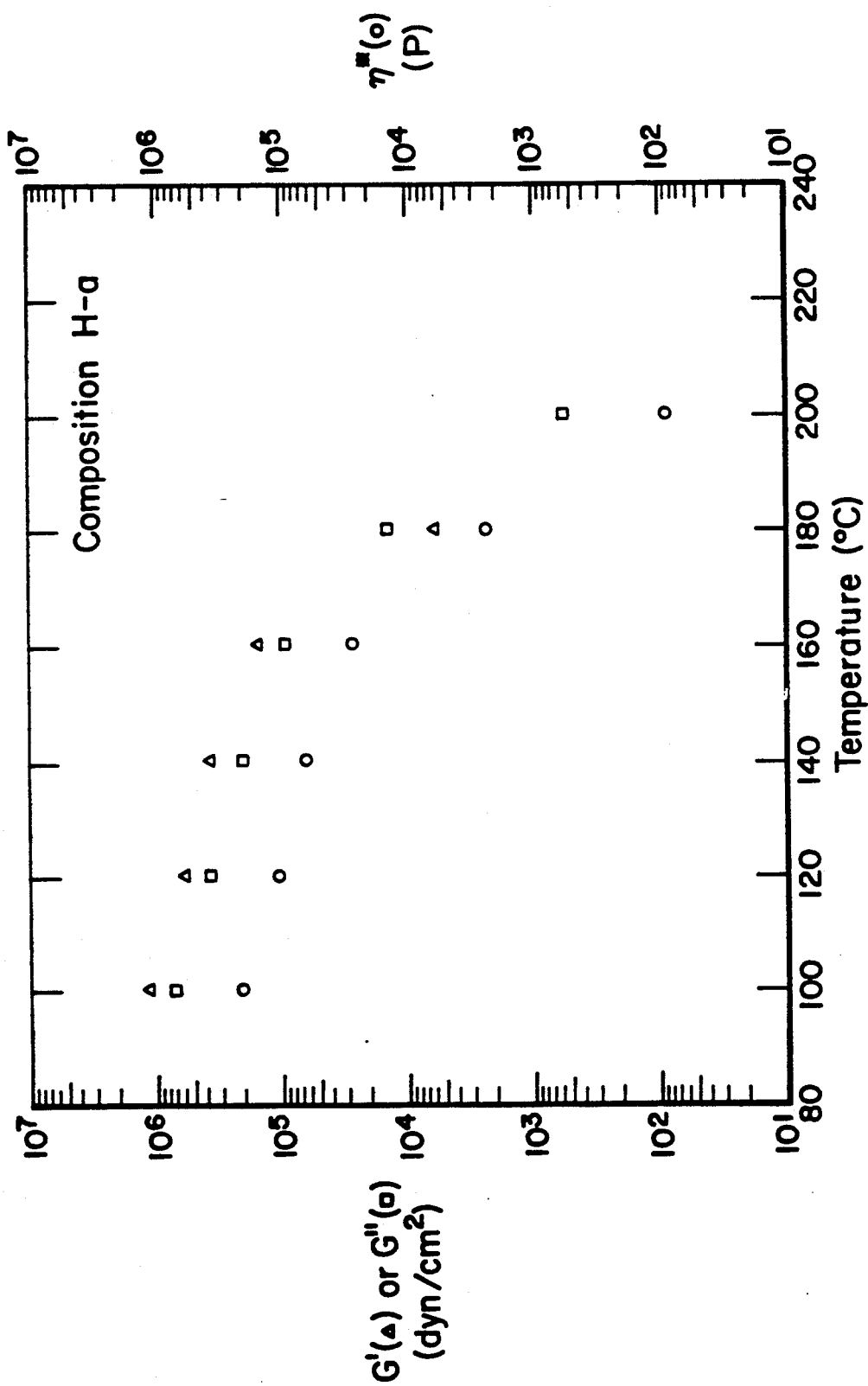
Figure 3:
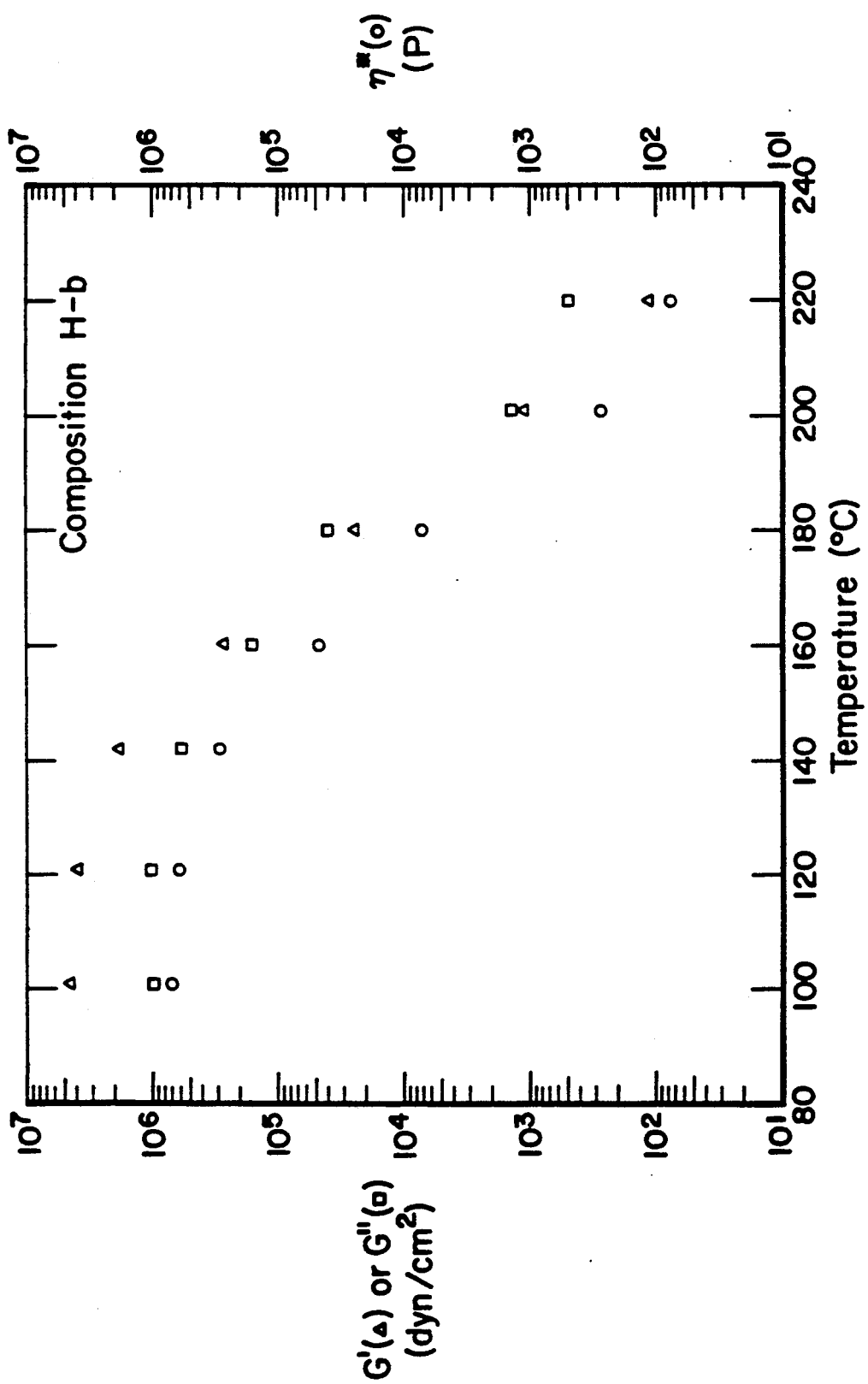
Figure 4:
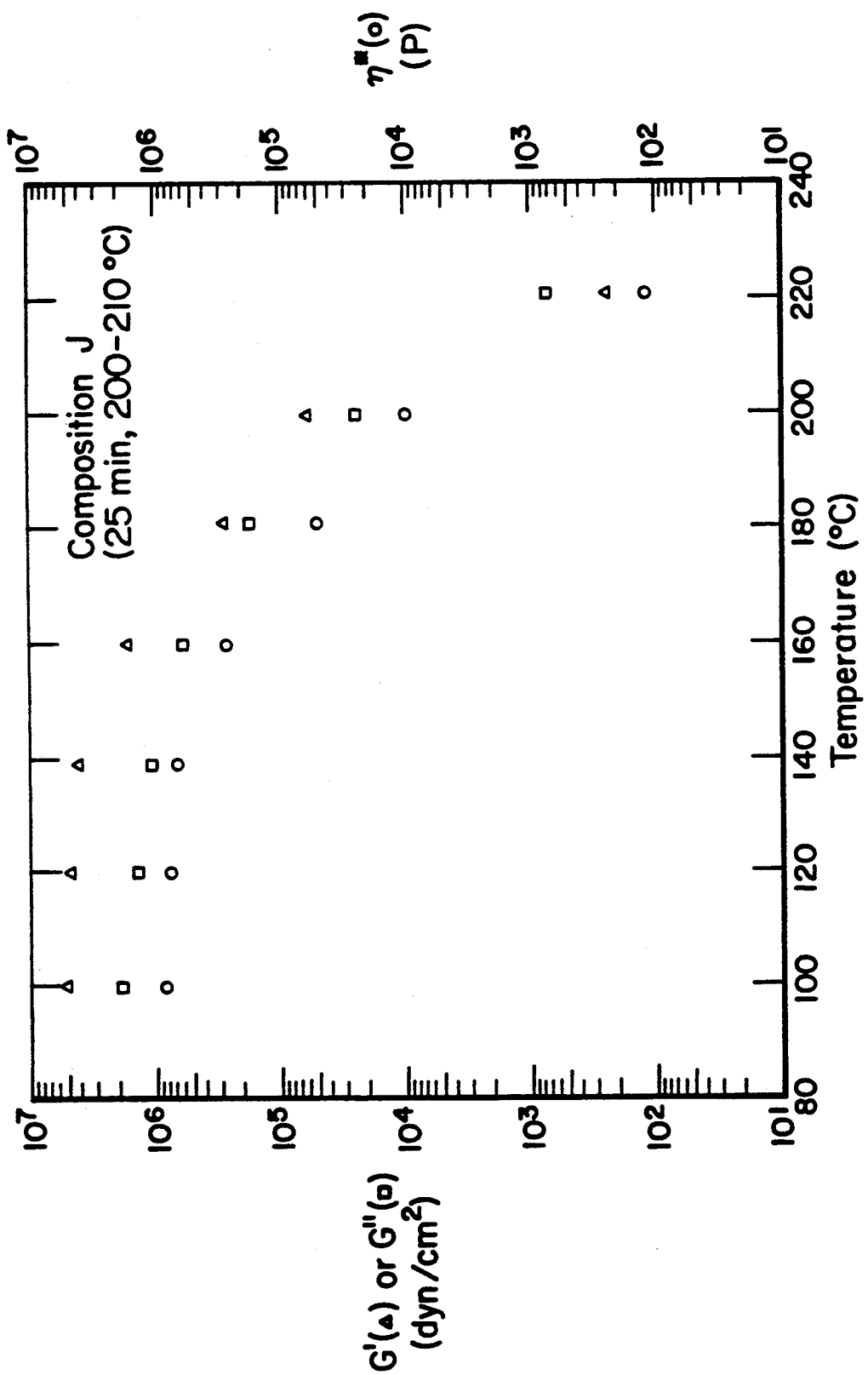
Figure 5:
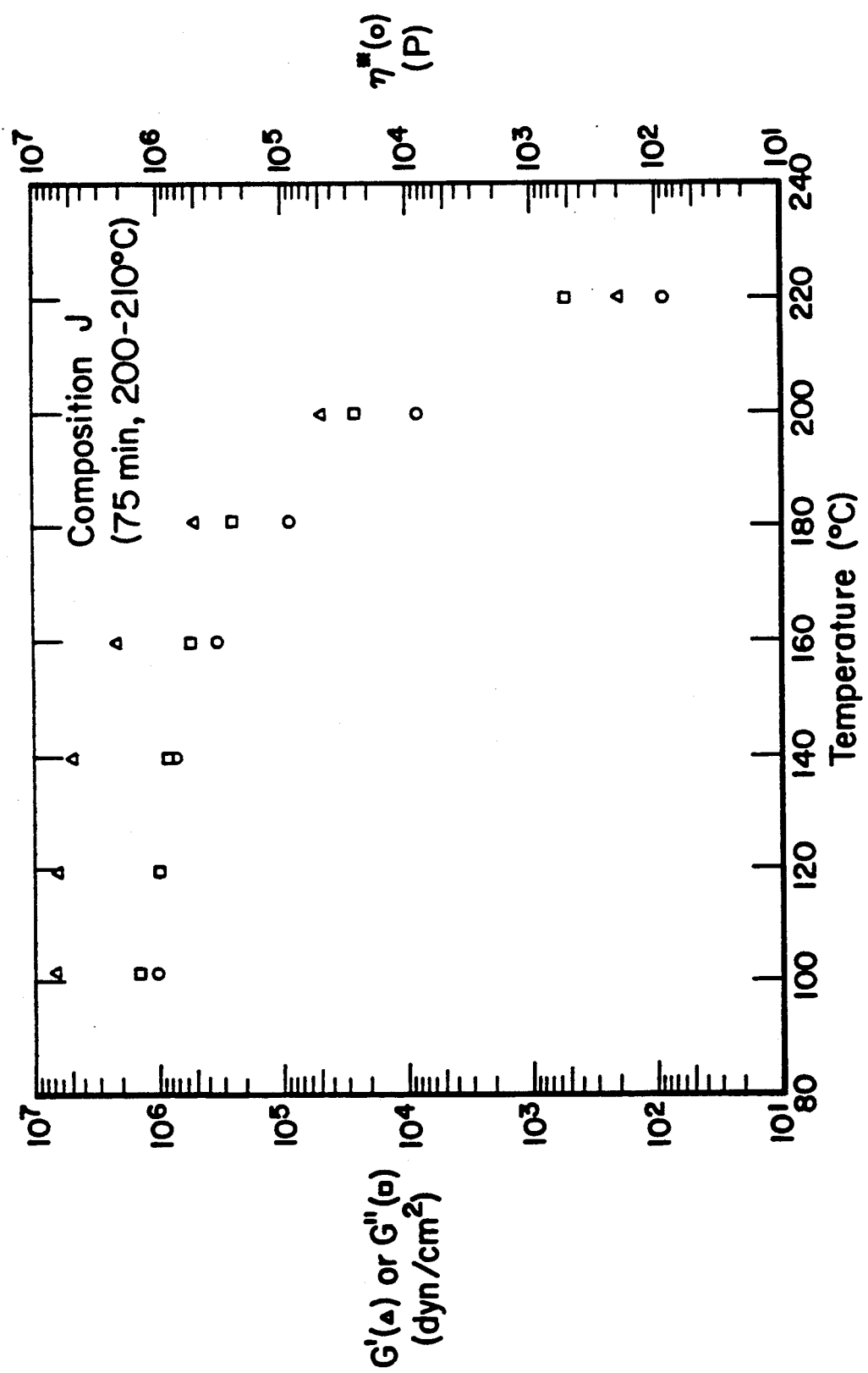

The compositions represented by H-a and J had a viscosity of about 2000 poise at 180° C. and 90 poise at 200° C. after 15 minutes (FIG. 2). This increased to about 10,000 poise at 200° C. (100 poise at 220° C.) after 25 minutes (FIG. 4). It was measured as 8,000 poise at 200° C. (90 poise at 220° C.) after 75 minutes (FIG. 5). Hence it was essentially unchanged between 25 and 75 minutes. Composition H-b showed greater viscosity at 10-15 minutes than H-a but less than J at 25 minutes. The shape of the curve indicates that the tin catalyst serves to speed up the thermal process but not change it. It is believed that the leveling off of the dynamic rheological parameter between 25-75 minutes indicates that equilibrium molecular weight for 210°-220° C. is reached and maintained. Hence a reproducible viscosity processing characteristic composition is obtained during this period.

Composition H-a was also measured by dynamic oscillatory mechanical spectrometry from −50° C. to 100° C. (FIG. 1) as well as from 100° C. to 200° C. (FIG. 2). The storage shear modulus (G") decreased rather sharply (from ~3×10$^8$ to 1×10$^8$ a dyne/cm$^2$) over the temperature range from about −15° C. to about 3° C. (transition range, centered at about 6° C.). It then decreased quite slowly (semi-plateaued) to about 60° C. It then showed a sharper decrease or transition (from about 5×10$^7$ to about 1.5×10$^6$ dyne/cm$^2$) over the 60°-80° C. range. It then decreased slowly again (semi-plateaued) from about 1.5×10$^6$ to 4×10$^5$ dyne/cm$^2$ over the temperature range from about 80° C. to about 130°-140° C. It then began to decrease more rapidly to a very low value or near zero by 200° C.

The behavior of both the storage and the loss shear modulus from −50° to 60° C. is indicative of a very tough, resilient composition. Values in the range of 10$^8$-10$^9$ dyne/cm$^2$ for the storage shear modulus are considered very good for mechanical performance (e.g. an adhesive under load), especially in resistance to cracking during thermal cycling or under high strain rate loading. This is especially important over this lower temperature range. This is believed to be related to either the covalent urethane crosslinking or to the polycarbonate component, or to a combination of these factors. The transition at about 60° C. may be related to a softening temperature of the polycaprolactone component. The second, more rapid, decrease in storage shear modulus, from 130°-140° C. to 200° C. appears to be related to the reversal of the aromatic urethane bonds, especially those forming the crosslinked network.

The storage shear modulus values for composition J, after 25 minutes and 75 minutes of heating at 200°-210° C. (FIGS. 4 and 5) show a second plateau from 100° to 140° C. much better, and at somewhat higher level (~7-5×10$^6$ dyne/cm$^2$) than is seen in composition H-a (FIG. 1). These data indicate some additional reaction, i.e. urethane bond formation, may have occurred upon further heating. They more clearly indicate possible urethane bond reversal, in particular the crosslinking bonds, above about 140° C.

The tensile lap shear strengths for the compositions are given in Table 5. The compositions based on the aromatic polyester oligomer HQ/IPA/HQ and the polycaprolactone diol (PCP 530) showed good room temperature strength (1800-2200 psi). Composition C was sufficiently strong and adherent to result in some bending of the metal tab end as the adhesive sample was broken with cohesive failure. The composition based on the polycarbonate diol (PC) provided higher strength (2760 psi) and considerably enhanced elongation or ductility. The adhesive samples extended about 40-50 percent before failure and the steel pieces were bent appreciably by bond failure. Bond failure was cohesive.

Hybrid compositions (D,E) containing about 8 weight percent of the diol as PC and 32 weight percent as the aromatic ester oligomer (HQ/IPA/HQ) or 40 weight percent of the diols as combined aromatic polyester and polycarbonate, showed enhanced room temperature strength (~2800 psi) and very good elongation or ductility (about 30 percent sample extension before failure). Again cohesive failure occurred and considerable steel bending was observed.

Compositions in which the TDI/TMP based crosslinker CB75 was used in addition to the hybrid aromatic polyester/polycarbonate combination, showed intermediate but very good strength (2350-2378 psi). Elongation (ductility) was intermediate between compositions C and D, and E.

Composition H (and its replicate J) showed the highest lap shear strength of (3000-3200 psi), the extensibility or ductility of these bonds was again intermediate between C and D, and E. Composition K was a repeat of J with NDI in place of MDI. A somewhat lower strength (2200) and slightly lesser ductility was observed than for K.

Compositions H and J were then tested at −35°±5° C., 120° C. and 130° C. For comparison, commercial hot melt adhesives PE6300HM and Unirez 2643, known to show good strength from −40° C. to moderately high temperatures (~100° C.) were also tested. The preparation and testing of the specimens is summarized above and in Table 3.

Composition J (MDI-based) showed excellent low temperature adhesive strength (3023 psi). It lost no strength and in fact was somewhat stronger at −35°±5° C. than at 23° C. It was stronger than, and also more extensible (ductile) than, the commercial polyester hot melt. Composition K (NDI-based) was not quite as strong as J or the commercial adhesives at −35°±5° C. but still had fairly good strength.

Both experimental adhesives were clearly superior to the commercial adhesives at 120° C. The NDI-based adhesive is clearly better than the MDI-based adhesive at higher temperatures. It still showed 644 psi at 130° C., while adhesive J was too weak to test at this temperature.

Hence these new adhesives based on hybrid compositions of aromatic polyester/aromatic polycarbonate diols, combined with an aliphatic polyester diol, and aromatic isocyanates, show a remarkable broad range of useful adhesive properties in this structural strength range.

TABLE 1

DIFFERENTIAL SCANNING CALORIMETRY[a]
OLIGOMER MELTING RANGE

| Example | Oligomer Structure[b, c] | DSC Melting, °C |
|---|---|---|
| 7 | HQDA/IPA/HQDA | 156–161 |
| 5 | HQ/IPA/HQ | 220–225 |
| 8 | PHBA/HQ/IPA/HQ/PHBA | 298–312 |
| 6 | BPA-C(BPA-C)₉-BPA | 198–215 (T_g 101) |

[a]Perkin Elmer 7 Series Thermal Analyzer, 10° C./minute, 7–8 mg sample
[b]Acronyms for components reacted together to produce the oligomer are used to depict the oligomer structure:
HQDA = hydroquinone diacetate
HQ = hydroquinone, IPA = isophthalic acid, TPA = terephthalic acid
PHBA = para hydroxybenzoic acid
BPA = bisphenol A (4,4'-isopropylidenediphenol)
C = carbonate derived from phosgene (P)
[c]Structures of Examples 5, 7 and 8 are all phenolic hydroxyl terminated aromatic ester oligomers based on the above (acronym) summarized structures. Example 9 is a bisphenol A phenolic hydroxyl terminated oligomer with a degree of polymerization (DP) of 9 (based on 10/9 BPA/P mole ratio).

TABLE 2

ADHESIVE COMPONENT EQUIVALENT WEIGHTS

| | Equivalent Weight | |
|---|---|---|
| Component[a] | OH | NCO |
| PCP530 | 265 | — |
| HQ/IPA/HQ | 174.2 | — |
| PP | 170.2 | — |
| TMP | 44.7 | — |
| PC | 1258. | — |
| CB75 | — | 323 |
| MDI | — | 125.1 |
| NDI | — | 105.1 |

[a]For definition of components, see Table 3.

TABLE 3

HOT MELT ADHESIVE COMPOSITIONS AND LAP SHEAR STRENGTH[a]

| Composition Number | PCP530[b] | HQ/IPA/HQ[c] | PPP[d] | PC[e] | CB75[f] | TMP[g] | MDI[h] | NDI[i] | Lap Shear Strength[j] lb/in² |
|---|---|---|---|---|---|---|---|---|---|
| A | 3.315 | 2.134 | 0.0425 | — | — | — | — | 2.645 | 1820 |
| B | 5.660 | — | 0.0425 | 4.330 | — | — | 3.140 | — | 2760 |
| C | 3.315 | 2.129 | 0.0425 | — | — | — | 3.140 | — | 2288 |
| D | 3.207 | 1.696 | 0.0360 | 0.433 | — | — | 2.814 | — | 2800 |
| E | 3.207 | 1.696 | 0.0360 | 0.433 | — | — | 2.802 | — | 2790 |
| F | 3.280 | 1.696 | 0.0360 | 0.433 | 0.073 | — | 2.802 | — | 2575 |
| G | 3.280 | 1.696 | 0.0360 | 0.433 | 0.786 | — | 2.560 | — | 2350 |
| H | 3.280 | 1.696 | 0.0180 | 0.580 | — | 0.101 | 3.116 | — | 3200 |
| I | 3.280 | 1.148 | 0.0180 | 4.540 | — | 0.101 | 3.116 | — | 2820 |
| J | 3.280 | 1.696 | 0.0180 | 0.580 | — | 0.101 | 3.116 | — | 3007 |
| K | 3.280 | 1.696 | 0.0180 | 0.580 | — | 0.101 | — | 2.617 | 2203 |

[a]All components in grams. Equal equivalent amounts of hydroxyl and isocyanate groups used in each composition. Compositions prepared by hand melt blending of diol/polyol/aromatic polyphenol components under an argon blanket, followed by addition of the aromatic di-or trisocyanates. The preparation of composition C is described in Example 9.
[b]PCP 530 = polycaprolactone diol, hydroxy equivalent weight 265.
[c]HQ/IPA/HQ = bishydroquinone diester of isophthalic acid, preparation described in Example 5, hydroxy equivalent weight 174.2.
[d]PPP = 4-phenylphenol (p-phenylphenol), hydroxy equivalent weight 170.2.
[e]PC = polycarbonate based on bisphenol A and phosgene, with phenolic hydroxyl end groups and a degree of polymerization of approximately 9. Preparation described in Example 6, hydroxy equivalent weight 1258.
[f]CB75 = Mondur CB75 triisocyanate crosslinker, isocyanate equivalent weight 232 (Mobay, based on trimethylolpropane reacted with 3 moles of toluene diisocyanate, TDI, to give an aromatic triisocyanate with ortho methyl groups adjacent to each isocyanate).
[g]TMP = trimethylolpropane, hydroxy equivalent weight 44.7 (reacts in-situ with MDI to provide an aromatic triisocyanate crosslinker).
[h]MDI = (4,4' diphenylmethane diisocyanate, isocyanate equivalent weight 125.1, Dow Isonate 125M).
[i]NDI = (1,5 - naphthalene diisocyanate, isocyanate equivalent weight 105.1, Mobay Desmodur 15).
[j]Lap shear strength. Test samples assembled from 1 in × 3 in (2.54 × 7.62 cm) steel coupons (R-13) from Q Panel Inc., Cleveland, Ohio. Tensile test in Instron Floor Model TTE. Results are average values for three adhesive test specimens. Hot melt composition (180–210° C.) hand applied to 1.0 × 0.5 in (2.54 × 1.77 cm) area of preheated (~180–200° C.) steel coupon. Coupons firmly pressed together and excess adhesive (exudate) scraped away. Assembled test samples then clamped together with two one-half inch, spring loaded, IDL binder clips. Heat quickly (~1 min) to ~200° C. in air oven then cool to ambient. Condition at 23° C., 50 percent relative humidity for 24 hours before testing.

TABLE 4

THERMAL CHARACTERIZATION OF HOT MELT ADHESIVE COMPOSITIONS

| Composition Number | DSC[a] | |
|---|---|---|
| | T_g | T_m |
| C | 46 | 144–220 |
| D | 44 | 144–220 |
| E | — | 140–227 |
| F | 44 | 155–222 |
| G | — | 165–215 |
| H-a[b] | 46 | 150–209 |
| H-b[c] | 48 | 181–202 |
| I | 49 | 135–193 |
| J | 50 | 150–215 |
| K | 43 | 160–203 |

[a]Perkin Elmer 7 Series Thermal Analyzer, 7–8 mg sample, 10° C./min. Compositions measured after about 10 minutes at 200–210° C.
[b]Composition H as mixed.
[c]A portion of composition H removed immediately after mixing 1–2 minutes and 0.1 parts by weight dibutyl tin dilaurate catalyst added, then heated another ~10 minutes. This shifts the melting point up about 30° C.

TABLE 5

LAP SHEAR STRENGTH[a]

| Sample Number | Description | Test Temperature, C.[b] | Maximum Load, lbs[c] | Lap Shear Strength, psi |
|---|---|---|---|---|
| Unirez 2643[d] | Commercial Polyamide | −35 ± 5 | 560 | 1120 |
| | | | 560 | 1120 |
| | | | 600 | 1200 |
| | | | 573 | 1147 |
| PE6300HM[e] | Commercial Polyester | −35 ± 5 | 1025 | 2050 |
| | | | 1060 | 2120 |
| | | | 1150 | 2300 |
| | | | 1078 | 2157 |
| J[f] | (IPA/HQ)/PC/ PCL/TMP + MDI | −35 ± 5 | 1857 | 3750 |
| | | | 2060 | 4120 |
| | | | 600 | 1200 |
| | | | 1511 | 3023 |
| K[g] | (IPA/HQ)/PC/ PLC/TMP + NDI | −35 ± 5 | 300 | 600 |
| | | | 400 | 800 |
| | | | 275 | 550 |
| | | | 325 | 650 |
| Unirez 2643 | Commercial Polyamide | 23 | 725 | 1450 |
| | | | 700 | 1400 |
| | | | 750 | 1500 |
| | | | 725 | 1450 |
| PE6300HM | Commercial Polyester | 23 | 650 | 1300 |
| | | | 775 | 1550 |
| | | | 565 | 1130 |
| | | | 663 | 1326 |
| J[f] | See above | 23 | 1500 | 3000 |
| | | | 1700 | 3400 |
| | | | 1300 | 2620 |
| | | | 1503 | 3007 |
| K[g] | See above | 23 | 975 | 1950 |
| | | | 1500 | 3000 |
| | | | 837 | 1660 |
| | | | 1102 | 2203 |
| Unirez 2643 | Commercial Polyamide | 120 | 3 | 6 |
| | | | 7 | 14 |
| | | | 4 | 8 |
| | | | 4.6 | 9.3 |
| PE6300HM | Commercial Polyester | 120 | 6 | 12 |
| | | | 4 | 8 |
| | | | 10 | 20 |
| | | | 6.7 | 13.3 |
| J[f] | See above | 120 | 280 | 560 |
| | | | 130 | 260 |
| | | | 155 | 310 |
| | | | 188 | 377 |
| K[g] | See above | 120 | 775 | 1550 |
| | | | 575 | 1150 |
| | | | 500 | 1000 |
| | | | 617 | 1234 |
| K[g] | See above | 130 | 400 | 800 |
| | | | 315 | 630 |
| | | | 250 | 500 |
| | | | 322 | 644 |

[a] Adhesive samples prepared using 1 × 3 in (2.54 × 7.62 cm) steel coupons (R-13, Q Panel Inc., Cleveland, Ohio). Hot melt composition (~200° C.) applied to 1.0 × 0.5 in. area of preheated (~150-200° C.) steel coupon. Clamped with small springline clamps and allowed to cool slowly. Conditioned at 23° C. for 24 hours then at test temperature for ten minutes prior to testing.
[b] Tested with Instron Floor Model TTE Cold (−35 ± 5° C.) test specimens prechilled in −40° C. isopropanol (chilled with dry ice and tested immediately). Heated samples (120° C., 130° C.) tested in Instron temperature control cabinet after equilibrating 10 min. All samples tested at 0.2 in/min have separation rate to break. Maximum load at break for three samples per test set and the mean value are listed (0.5 in² area).
[c] Cold (−35 ± 5° C.) test specimens prechilled.
[d] Union Camp commercial polyamide hot melt adhesive.
[e] H. B. Fuller commercial polyester hot melt adhesive.
[f] Aromatic/aliphatic polyester-polycarbonate diols plus 10 equivalent percent trimethylol-propane (TMP) crosslinker, and 0.05 equivalent percent p-phenyl (PPP) for end capping groups, reacted with diphenyl methane diisocyate (MDI) in nearly 1/1 equivalent ratio of aliphatic and aromatic (phenol) hydroxyl/isocyanate groups. IPA/HQ = bis-hydroquinone/isophthalic acid diester diol, PC = hydroxyl (phenol) capped bisphenonal A/phosgene polycarbonate oligomer with degree of polymerization = 9, PCL = PCP530 (polycaprolactone diol, MW 530).
[g] Aromatic/aliphatic polyester - polycarbonate diols, plus 10 equivalent percent trimethylol-propane (TMP) crosslinker, and 0.05 equivalent percent p-phenylphenol (PPP) for end capping groups, reacted with 1,5-naphthalene diisocyanate, or NDI, in nearly 1/1 equivalent ratio of aliphatic and aromatic (phenol) hydroxyl/isocyanate groups, same polyester and polycarbonate diol oligomers as in adhesive J.

The following examples are disclosed to further teach the practice of the invention and are not intended to limit the invention as it is delineated in the claims.

EXAMPLE 1

To a clean flame-dried 250 ml Pyrex round-bottom flask was added 5.2 g (0.040 eq) Isonate 143L (80% diphenylmethane diisocyanate and 20% of its triisocyanate cycloadduct) from Upjohn's polymer chemicals and 3.8 g (0.040 eq) of phenol. The flask contents were gradually heated in an oil bath to 160° C. under argon to obtain a uniform melt. Molten Niax polyol PCP-0200 (5.3 g, 0.020 eq) was gradually blended into the melt and the flask temperature maintained at 156° C. during the addition. A yellow-white precipitate was noted after the addition which gradually remelted as the temperature was increased to 165° C. Then 2.35 g (0.020 eq) of bisphenol A was melt blended into the melt. The temperature of the mixture was gradually increased to 240° C. (464° F.) to drive the equilibrium of the phenol/bisphenol A reaction in favor of reacting with bisphenol A and thus distilling off phenol. During this increase in temperature the melt became an orange-gold viscous liquid and most probably a prepolymer. In this way 2.0 g of phenol was distilled from the prepolymer melt over a 20 minute period. The product was a clear viscous melt which solidified when cooled to an insoluble, tough plastic with good adhesion to steel.

EXAMPLE 2

Example 2 was done in the same manner as Example 1, using Niax polyol PCP-0260 (30.0 g, 0.020 eq) instead of PCP-0200. No precipitate was noted during this procedure. The resulting hot melt of this experiment qualitatively seemed to produce better bonding properties than the product of Example 1. This is most likely due to an increase in the molecular weight of the polycaprolactone diol used and thus an increase in the strength and toughness of the crosslinked polyurethane-polyester product.

Examples 1 and 2 were carried out using Upjohn's polyisocyanate Isonate 143L (80% diphenylmethane diisocyanate and 20% of its triisocyanate cycloaddduct) and Union Carbide's Niax polyols PCP-0200 and PCP-0260 (polycaprolactone diols of varying DP). These proved quite successful. Initially, two equivalents of the Isonate 143 L were blocked with two equivalents of phenol at 160° C. to protect the isocyanate groups against hydrolysis. The phenol could then be selectively removed as needed by reaction with the aliphatic polydiols or by equilibration with polyphenols. Thus, molten PCP-0200 (Example 1) or PCP-0260 (Example 2) were gradually added to the blocked Isonate 143L/phenol product and the temperature maintained at 160° C. Then with stirring, one equivalent of bisphenol A (relative to the aromatic phenol urethane groups) was added and the temperature of the mixture was gradually increased to about 240° C. to drive the equilibrium of the phenol/bisphenol A reaction in favor of reacting with bisphenol A and removing phenol by distillation. The removal of nearly one equivalent of phenol in Examples 1 and 2 produced a bisphenol A extended, phenol end-capped Isonate 143L-PCP polyester-polyurethane block copolymer.

EXAMPLE 3

The resulting melts of Examples 1 and 2 were tested as reactive hot melt adhesives by application to pairs of steel coupons. The melts were observed to have instant tack to steel and aluminum substrates and developed qualitatively good adhesive and cohesive strengths as they cooled and resolidified. However, it was qualitatively easier, using the hand assembly procedure, to obtain good flow-out to a thin adhesive layer of the molten adhesive between the pieces of metal, if the metal was preheated to about 50°-60° C. Consequently, the test adhesives were applied to approximately 1 in.$^2$ overlapping areas of trichloroethane degreased 1 in.$\times$5 in. steel coupons cut from Q-panels and previously heated on a hot plate to about 60° C. The coupons were overlapped with slight pressure for 10 seconds and allowed to cool to room temperature. A very strong (qualitative) bond resulted. The bond was still strong and unchanged after 40 days at room temperature and moisture.

EXAMPLE 4

Retained samples of the neat polymer product from Examples 1 and 2 exposed to room air and moisture for 40 days remained tough and pliable. Small (0.2–0.4 g) samples gave a free-flowing, moderate viscosity, liquid at 400° F. This product swelled (several volumes) but did not dissolve in methyl cellosolve acetate or trichloroethylene at room temperature. These results show that the adhesive is still crosslinked, strong, and tough at room temperature, but readily depolymerized to uncrosslinked, relatively low molecular weight fragments at about 400° F.

EXAMPLE 5

Preparation of Bis-Hydroquinone Ester of Isophthalic Acid

Two hundred fifty ml of dry (H$_2$O<0.001%) dimethyl acetamide (DMAC; Dimethylacetamide; Aldrich 21,707-2) and 43.5 gm (44.5 cc; 0.525 moles) dry (over CaH$_2$) pyridine (Aldrich 36,057-0) were added to a flame dried 2 liter, 3 neck round bottom flask equipped with a Trubore stirrer (Teflon paddle), inert gas (argon) inlet and outlet, thermometer, and stoppered pressure equalizing addition funnel. While stirring slowly with an argon flush, vacuum dried (60° C., 24 hr, 0.5 Torr) crystalline hydroquinone (99%; Aldrich 1,790-2; 220.2 gm; 2.00 mole) was added slowly enough to prevent clumping. The isophthaloyl chloride (IPC; Aldrich 36,0570-0 as received; 50.8 gm; 0.250 moles) was dissolved separately in 300 ml additional dry dimethyl acetamide in a flame dried 500 ml round bottom flask, also under argon flushing. The IPC/DMAC was gently heated on a heating mantle while hand slurrying to dissolve. The clear light yellow solution was then placed in the dropping funnel and added to the rapidly stirred HQ solution over a 45 minute period. The temperature quickly rose to about 55°. C. then stabilized until the IPC addition was complete. There was no precipitate (pyridine hydrochloride) at this point. A small aliquot of this solution when cooled to ~5° C. exhibited crystallization of water soluble pyridine hydrochloride. However, the entire reaction mixture was precipitated in 4 liters of distilled water. Surprisingly, this provided insoluble product diester and solubilized the unreacted HQ and the pyridine hydrochloride. The light yellow precipitate was easily filtered using a 25-50 μm fritted glass Buchner funnel and aspirator vacuum. It was washed thoroughly with distilled water, air dried overnight in a thin layer in a pyrex baking dish, then vacuum dried to provide 69 g of light yellow, powdery solid with a Fisher-Johns hot stage melting point of 221°-222° C. This was a 79 percent recovery based on a theoretical yield of 87.6 g of the bis-hydroquinone ester of isophthalic acid. DSC thermal analysis (7.5 mg, Perkin Elmer 7 Series Thermal Analyzer, 10° C./min) showed a melting exotherm at 220°-225° C. The proton NMR spectrum was determined using a Brucker high resolution NMR. There are 14 total proton assignments, with 2 phenolic protons (14.8 percent theoretical). Found were 12.90 percent phenolic protons at $\delta 9,50$ (ppm). This was in good agreement with the expected total.

EXAMPLE 6

Preparation of Phenolic-hydroxyl Terminated Bisphenol A/Phosgene Polycarbonate Oligomers The 4,4'-isopropylidenediphenol (Bisphenol A)(BPA; Aldrich 13,302-7, 99.4%; 45.3 gm, 0.2000 mole; vacuum dried at 60° C., 0.2 Torr for 4 hours) was added to a flame dried, argon purged, 300 ml, 3 neck round bottom pyrex flask fitted with an inert (argon) gas inlet and outlet, flame dried dropping funnel and Trubore stirrer with Teflon blade. Ninety ml of dry methylene chloride ($CH_2Cl_2$; Burdick and Jackson 300-4, dried over $CaH_2$) followed by 52.0 ml dry triethylamine (Aldrich 13,206-3; dried over $CaH_2$; 0.187 mole) were added through the dropping funnel. The dropping funnel was rinsed with 10 ml more $CH_2Cl_2$. The BPA was dissolved by stirring slowly for 30 minutes at room temperature. A slight positive argon pressure was maintained (1 bubble of gas per 2 or 3 seconds through a mineral oil filled gas outlet bubble tube). A 50 cc hypodermic syringe was predried (disassembled, 1 hour in air oven at 110° C.) and cooled to room temperature in a desiccator containing Drierite. It was reassembled and rinsed and conditioned with some phosgene in toluene, which was ejected and discarded. The syringe was loaded and 50 cc phosgene solution (Fluka 79380, 20% in toluene; 1.93 Molar, 2% Hcl impurity) was delivered to the dropping funnel. The syringe was loaded again and an additional 43.3 cc of the phosgene solution delivered for a total of 93.3 cc (17.8 gm, 0.180 mole). Twenty-five ml of $CH_2Cl_2$ was layered on the phosgene solution and then added with rapid dropwise addition to the rapidly stirred bisphenol A solution. A precipitate appeared after about 7 ml of the phosgene solution was added. As the addition continued, the reaction mixture began to heat up. The flask was cooled with a water/ice bath to keep it near room temperature. All phosgene solution was added after about 33 minutes. The dropping funnel was rinsed into the reaction flask with an additional 25 ml $CH_2Cl_2$. The reaction mixture was a slightly viscous moderately thick slurry. It was left stirring slowly overnight at room temperature. The slurry appeared unchanged the next morning. It was easily filtered through a "C" fritted glass Buchner funnel providing a clear light yellow solution and a fine white precipitate. The precipitate was washed three times with ~50 ml portions of $CH_2Cl_2$ and air dried. Obtained were 36.7 g water soluble white powder (72 percent recovery based on theoretical pyridine hydrochloride yield of 50.9 g). The missing salt was presumed dissolved in the oligomer solution.

The polycarbonate oligomer solution was concentrated to ~200 ml and precipitated in a ten fold excess (~2 liters) of reagent grade methanol by slow hand addition (~45 minutes) to the rapidly hand-stirred methanol. A fine white precipitate that readily separated to give a cloudy supernatant liquid was obtained. This was filtered through number 2 Whatman filter paper on a Buchner funnel. It was washed four times with 50 ml portions of fresh methanol and air dried overnight. It was then vacuum dried at room temperature for two days. Obtained were 43.1 g of white powder. This is an 87.5 percent recovery based on a theoretical oligomer yield of 50.2 g. Apparently some pyridine hydrochloride and product oligomer either were dissolved in, or colloidally dispersed in, the methanol filtrate.

The oligomer melted at ~205°-215° C. on a Fisher-Johns hot stage melting point apparatus. DSC thermal analysis showed a $T_g$ (endotherm) at 101° C. and a melting exotherm of 198°-215° C. Proton NMR analysis in deuterated DMSO gave a spectrum consistent with a DP9 polycarbonate oligomer with phenolic hydroxyl end group protons ($\delta$, ppm 9.2). This is based on the presence of 60 methyl protons, 80 aromatic protons and 2 hydroxyl protons. Theoretical hydroxyl protons, 1.42%; found 1.48%.

EXAMPLE 7

Preparation of Bis-Paraacetoxyphenyl Ester of Isophthalic Acid

The isophthalic acid (IPA; Aldrich 99% as received; 96.6 gm, 0.576 mole) and the hydroquinone diacetate (HQDA; Frinton Labs 96% as received; 465.65 gm, 2.304 mole) were added to a 3 neck, 3 liter flask fitted with a Trubore stirrer (Teflon paddle), inert gas (argon) inlet purge tube and argon outlet (through a mineral oil bubble tube to visualize gas purge rate), and Claisen head with two thermometers, one with adjustable height (for insertion in the melt during the reaction), and one at the distillation exit to measure distillation temperature. A water cooled distillation condenser was connected to the Claisen head to condense acetic acid byproduct. The mixture was heated to the melting temperature (~160°-170° C.) using a Glasscol 3-liter heating mantle. The temperature under the heating mantle (between the mantle surface and the flask surface) was monitored with two thermocouples, one under the bottom center of the flask and one about half way up one side of the heating mantle/reaction flask interface. The temperature of the reaction mixture was controlled by using the thermometer in the melt as the measuring-/temperature controller via an $I^2R$ Thermowatch L8-2000 SS capacitance controller (capacitor band adjusted on a mercury thermometer to the desired control temperature). This was held constant at 230° C. The temperatures under the bottom and at the side of the flask/mantle interface were observed closely, and maintained at 242°±3° C. and 232°±3° C. respectively throughout the reaction period by using a Variac set at 30-50 volts. The coreactants were melted over a 45 minute period of slow heatup from ambient temperature to ~167° C., while purging the melt with argon gas. Over the next hour, the melt temperature was raised to 230° C. (mantle/flask bottom 230° C., side 221° C.). While stirring vigorously, and continuing a slow argon purge (~1 bubble per sec). Acetic acid was distilled steadily for approximately 4 hours 15 minutes. Recovered were 68.2 g of byproduct acetic acid, or 98.7 percent of the theoretical yield of 69.1 g.

The product was a light tan solid containing a large amount (~232.8 g) of excess, unreacted HQDA. Since HQDA solubility in methanol ($CH_3OH$) is ~6.3 weight percent at 23° C., >4.7 liters of $CH_3OH$ should dissolve all unreacted HQDA. Therefore, the product was crushed into a fine powder and washed with 2.8 liters of methanol by slurrying the powder in the methanol for several hours and suction filtering through a 25-50μ frit. It was then treated similarly four more times, using 1.2 liters of methanol per trituration. Hence, the product was washed with a total of 7.6 liters of methanol, or 2.9 liters more than the amount required to dissolve 233 g. The solid product was dried and yielded 192 g (76.8 percent of theoretical) of HQDA/IPA/HQDA. The light tan solid melted at 140°-155° C. on a Fisher Johns hot stage melting point apparatus. The melting point determined by DSC was 156°-161° C. Proton NMR was run in DMSO. The spectrum is in good agreement with the expected bis-paraacetoxy ended aromatic ester.

EXAMPLE 8

Preparation of PHBA/HQ/IPA/HQ/PHBA Phenolic-hydroxyl Terminated Oligomer

The bis-paraacetoxyphenyl ester of isophthalic acid (67.46 gm, 0.1553 mole) from Example 7 was added to a three neck, three liter flask fitted with a Trubore stirrer (Teflon paddle), inert gas (argon) inlet purge tube and argon outlet (through a mineral oil bubble tube to visualize gas purge rate) and Claisen head with two thermometer (one with adjustable height for insertion in the melt during the reaction), and one at the distillation exit to measure distillation temperature. A water cooled distillation condenser was connected to the Claisen head to condense byproduct acetic acid. The solid isophthalic acid bis-ester was headed to its melting temperature of abut 155° C. over a 25 minute period, while purging the flask with a vigorous stream of argon, using a Glasscol 3-liter heating mantle. Then the p-hydroxybenzoic acid (PHBA; Aldrich H2,005-9, 99%; 43.33 gm, 0.1533 mole) was added. The melt (pot) temperature was raised to 225° C. over an 18 minute period. Acetic acid distillation started.

The temperature under the heating mantle (between the mantle surface and the flask surface) was monitored with two thermocouples, one under the bottom center of the flask and one about half way up one side of the heating mantle/reaction flask interface. The temperature of the reaction mixture was controlled by using the mercury level of the thermometer in the melt as the measuring/temperature controller via an $I^2R$ Thermowatch L8-2000 SS capacitance controller. This was held constant at 225° C. The temperatures under the bottom and at the side of the flask/mantle interface were observed closely, and maintained at 215°±3° C. respectively throughout the reaction period by using a variac set at 30-45 volts.

Acetic acid was slowly distilled over a four hour period, with 15.4 gm (15.4/18.7×100=82.4 percent of theoretical) collected. During the last hour, the rate of acetic acid distillation fell to nil. PHBA is known to thermally decarboxylate slowly at the temperature of this reaction to provide $CO_2$ and unreactive phenol and it was concluded this side reaction had occurred to some extent. Hence, another additional 25 g of PHBA was added and the reaction continued at a melt (pot) temperature of about 220° C. for ~4 hours and an additional 2.6 g acetic acid were collected. However, the acetic acid evolution had again essentially ceased. Another 25 g PHBA were added and the reaction continued for another two hours and another 1.0 g of acetic acid was collected before evolution ceased, to give a total of 18.9 gm. This is 100.8 percent of theoretical (18.9/18.75×100=100.8 percent). Hence, the reaction to convert the bis-acetoxyphenyl ester to the bis-hydroxyphenyl tetraester went essentially to completion. The pot temperature was raised to ~235°-240° C., the distillation condenser cooling water shut off and the argon purge increased greatly. Much of the byproduct phenol was then distilled, 41.1 gm collected, or 82 percent of the 50.3 g expected from thermal dissociation of the 0.214 mole of excess PHBA used. The crude product yield of bis-phenol terminated tetraester was 101.77. If unaccounted phenol (~9.2g) is subtracted, this gives 92.57 g. This compares very well with the theoretical or expected yield of 91.7 g. The extra 0.9 g is attributed to a small amount of the excess PHBA still being present (not decomposed to $CO_2$ and phenol).

A large portion (95.91 g) of this crude product was washed thoroughly (triturated 24 hours) with two liters of methanol to dissolve the phenol and unreacted PHBA. The slurry was suction filtered on a 25-50 μm glass fritted Buchner funnel. The light tan powder was vacuum dried 18 hours at 66° C. and 30 in Hg in a vacuum oven. The dry powder weighed 79.85 g (83.3 percent recovery, or 16.7 percent removed by the methanol wash). The Fisher Johns hot stage melting point was ~280°-300° C. DSC melting characterization using the Perkin Elmer 7 Series thermal analyzer (7.5 mg sample, 10° C./min) showed melting at 298°-312° C.

EXAMPLE 9

Hot Melt Adhesive Composition C

The polycaprolactone diol (PCP-530; Aldrich 18,940-5; 3.315 gm (0.0250 eq), paraphenylphenol (PPP; Aldrich 13,434, 97%; 0.0425 gm, 0.0050 eq) and bis-hydroquinone isophthalic acid diester oligomer (HQ/IPA/HQ, phenol end groups from Example 5; 2.129 gm, 0.0245 eq) were melted together while hand mixing with a stainless steel spatula in a 180 ml electrolytic (deep) beaker under an inert gas (argon) blanket at about 150° C. The diphenylmethanediisocyanate (crystalline MDI, Isonate 125M, Dow, mp 37° C.; 3.140, 0.0500 eq) was added while the melt was stirred at ~150° C. It was quickly incorporated in the melt and the viscosity increased to a fairly high level in about five minutes. The melt was heated to 180° C. and the viscosity decreased to a very easily stirred level. Adhesive specimens were then hand assembled by applying melted adhesive to 0.5×1.0 inch areas (1.27×2.54 cm) on the ends of 1×3×0.032 inch (2.54×7.62×0.0813 cm) dull finish steel ¼ hard (R-13) coupons (Q Panel Inc., Cleveland, Ohio). The steel test coupons had been hand cleaned/degreased first with a kimwipe soaked with toluene, then one soaked with methyl alcohol, and preheated on a hot plate set at ~180° C. surface temperature. The test samples were adjusted to give 0.5 $in^2$ (1.61 $cm^2$) contact area, firmly pressed together by hand, the excess adhesive exudate scraped away and the assembled test specimen clamped together with two, one-half inch, spring loaded, IDL binder clips. One clip was placed on each side of the overlapped bond area. The partially cooled samples were then placed in a 200° C. air oven briefly (3-5 minutes) to insure that the adhesive had flowed and contacted all the metal surfaces. The samples were then allowed to cool to ambient temperature and placed in a constant temperature/humidity (73° F., 20% relative humidity) room to condition for 24 hours prior to testing.

EXAMPLE 10

Hexanediamine Polyimide Composition

Meltable polyimide oligomers with phenolic hydroxyl end groups were prepared based on flexibilized aromatic dianhydrides (DA), aromatic or aliphatic diamine couplers (DAm) and aromatic amine phenol endcappers (AP). For example, oxydiphthalic anhydride (ODPA, Oxychem, Occidental Chemical Corp.; 0.0200 mole) and a 4-aminophenol (4AP; 0.0200 mole) endcapper to provide 4-hydrophenylimide oligomer end groups were used to form an oligomer that was based on linking the ODPA with a flexible aliphatic linking group (1,6-hexanediamine; 0.0100 mole). This oligomer is structurally described by the following acronym sequence (4AP/ODPA/HDA/ODPA/4AP). It has four imide and two aromatic ether linking groups. It has a molecular weight of 754.9 and a phenolic hydroxyl equivalent weight of 377.4 and a melting range of 180°–190° C.

EXAMPLE 11

Oxydianiline Polyimide Composition

A second oligomer was prepared in which the HDA of Example 10 was replaced with ODA (4,4'-oxydianiline). This oligomer is structurally described by the following acronym sequence (4AP/ODPA/ODA/ODPA/4AP). It has four imide and three aromatic ether linking groups. It is an all aromatic 4-hydroxyphenyl-terminated oligomer with a molecular weight of 968.9 and a phenolic hydroxyl equivalent weight of 484.5. It melted at 260°–275° C.

EXAMPLE 12

Polyimide Adhesive Composition

Two hot melt adhesive compositions were prepared using the 4-phenolic hydroxyl ended polyimide oligomer from Example 10. The first composition was based on composition H. The same formulation and procedures were used except that 4.298 g (0.004868 moles) of the polyimide oligomer were used in place of the HQ/IPA/HQ aromatic ester oligomer (Example 5). The composition increased rapidly in viscosity when the MDI was added and the melt was stirred while heating at $\sim 150°$ C. Within five minutes the melt started to solidify and had to be heated to $\sim 220°$ C. to reduce the melt viscosity to an acceptable level to apply as a hot melt adhesive. Three adhesive samples were assembled by applying the heated melt to the preheated ($\sim 180°$ C.) steel coupons (1 in×3 in; 2.54×7.62 cm). The coupons were quickly pressed together and adjusted to provide 0.5 in² of adhesive bonded overlap area. They were clamped together as before and allowed to cool. They were tested at 23° C. and 50 percent relative humidity (after 24 hours conditioning under these conditions) in the Instron. The three samples tested 3140, 3260 and 3120 psi (average 3173 psi). The steel coupon ends were bent. The breaks were cohesive and ductile, that is about 40 percent elongation was observed at failure. Hence, the polyimide oligomer provides a tough, very strong adhesive bond quality to the reversible polyurethane adhesive.

EXAMPLE 13

Polyimide Adhesive Composition

The second hot melt composition containing the same polyimide oligomer (Example 10) was a repeat of Example 12 except that the polycarbonate oligomer was omitted and replaced with an additional amount of the polyimide oligomer. Hence, the composition contained only PCP530 (1.640 g), PPP (0.0090 g), PI from Example 10 (2.218 g), TMP (10.0507 g) and MDI (1.558 g). The mixture increased in viscosity more rapidly than the prior polyimide-containing hot melt (Example 12). It also had to be heated to 220° C. to melt the adhesive for application to preheated (180° C.) steel coupons. Again three test samples were hand assembled, clamped together, cooled and tested at 23° C. after 24 hours conditioning at 23° C. and 50% relative humidity. The lap shear strength test results were 3400, 3650 and 3642 (average 3564 psi). Again the steel coupon ends were bent. Hence, this was the strongest adhesive (room temperature) prepared. It was comparable in toughness ($\sim 40$ percent elongation) to the prior composition. Hence, the polyimide component provided comparable toughness, but with higher strength, than the prior composition that also contained polycarbonate oligomer.

EXAMPLE 14

Tetraphenol Ionic Crosslinker

A meltable zinc dicarboxylate salt was synthesized from a bisphenol containing a carboxylic acid group and zinc diacetate by a thermally driven disproportionation reaction. Byproduct acetic acid was evaporated as it formed driving the formation of the di-bisphenol zinc dicarboxylate to completion. Thus 5.726 grams (0.0200 moles) of 4,4'-bis (4-hydroxyphenyl) valeric acid (Aldrich B4,770-7, 95%) and 2.195 grams (0.0100 mole) of zinc diacetate dihydrate (Aldrich 22,335-2, 98%) were added to a 180 ml electrolytic beaker. An argon gas flush was directed over the contents to displace air (oxygen). The beaker was placed in molten woods metal in a bath thermostatically controlled at 195°–200° C. The contents were hand stirred with a stainless steel spatula. The bisphenol (m.p. 167°–170° C.) melted quickly and a slurry of the zinc diacetate was observed. Very quickly boiling commenced and acetic acid began to distill off rapidly. It was swept from the reaction zone with a vigorous argon purge. In $\sim 15$ minutes, the slurry became a clear red, slightly viscous melt and the distillation of acetic acid ceased. The clear melt solidified to 6.42 grams of a clear, hard, red glassy solid at room temperature. The theoretical yields were 1.20 grams (0.02 moles) of acetic acid, 0.18 grams water (0.0100 mole) and 6.54 grams of zinc dicarboxylate salt of the bisphenol carboxylate compound. Hence, a near theoretical yield of zinc salt product was obtained (6.42/6.54×100=98.2 percent of theoretical).

EXAMPLE 15

Hot melt adhesive compositions were prepared using the zinc dicarboxylate salt of 4,4'-bis (4-hydroxyphenyl) valeric acid of Example 14 in place of trimethylolpropane (TMP) as the trifunctional crosslinker. Composition H was repeated using 0.240 grams (0.00151 equivalents of phenolic hydroxyl groups) of the zinc salt. Hence 3.280 grams PCP 530, 0.0180 grams PPP, 1,696 grams of the aromatic bis-hydroquinone ester of isophthalic acid (example 5), 0.580 grams of the polycarbonate oligomer of example 6, and the 0.240 grams of the zinc compound were melted together in a 180 ml electrolytic beaker, while stirring under argon with a stainless steel spatula, at ~210° C. The clear, thin melt was cooled to ~130° C. and 3.026 grams of MDI added. The mixture was heated to ~150° C. then to ~180° C. while stirring over an ~10 minute period. The viscosity increased steadily. It was then heated to ~210° C. where a thin melt was obtained. Four lap shear test samples were hand prepared, as before, by applying adhesive to the steel tab ends preheated to ~180° C. on a hot plate. The test specimens were clamped, heated five minutes at ~200° C. in an air oven, cooled, and conditioned at 23° C. and 50 percent relative humidity for four hours. They were then tested in the Instron machine. Obtained were values of lap shear strength of 3760, 3000, 3900 and 3150 lbs/in$^2$ at 23° C. The breaks were cohesive and quite ductile (~40 percent elongation). The average value was 3332 lbs/in$^2$. This compares very favorably with the results for composition H. The adhesive was, however, found to be soluble in NMP at room temperature. This result was unexpected and may be due to the highly polar nature of NMP and possible water content in the solvent used for test. The water and polar environment may facilitate bond reversal.

While there has been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

We claim:

1. A stable, melt-processable, high-temperature polymer composition comprising a labile-hydrogen functionality segment reacted with an isocyanate functionality segment to form a thermally-reversible, isocyanate-labile hydrogen backbone linkage that dissociates above about 150° C. into said labile-hydrogen segment and said isocyanate segment to produce a melt with a viscosity of less than about 100,000 poise.

2. The melt processable polymer composition of claim 1 wherein said viscosity of said melt is less than about 20,000 poise.

3. The melt processable polymer composition of claim 1 having a storage shear modulus of more than about 10$^6$ dyne/cm below about 100° C.

4. The melt processable polymer composition of claim 3 having a storage shear modulus of more than about 10$^6$ dyne/cm below about 150° C.

5. The melt processable polymer composition of claim 1 having a viscosity of more than about 10$^6$ poise below about 100° C.

6. The melt processable polymer composition of claim 5 having a viscosity of more than about 10$^6$ poise below about 150° C.

7. The melt-processable polymer composition of claim 1 further comprising thermally-reversible, isocyanate-labile hydrogen cross-links between neighboring polymer chains.

8. The melt-processable polymer composition of claim 1 wherein said isocyanate-labile hydrogen backbone linkage is bonded to an aryl group.

9. The melt-processable polymer composition of claim 1 wherein said isocyanate-labile hydrogen backbone linkage is bonded to an alkyl group.

10. The melt-processable polymer composition of claim wherein said isocyanate-labile hydrogen backbone linkage is bonded to an aryl and an alkyl group.

11. The melt-processable polymer composition of claim 1 wherein said isocyanate-labile hydrogen backbone linkage is bonded only to aryl groups.

12. The melt-processable polymer composition of claim 1 wherein said labile-hydrogen segment is selected from the group of functionality segments consisting of amides, alcohols, amines, oximes, triazoles, imidazoles, imidazolines and iminodiazolidinediones.

13. The melt-processable polymer composition of claim 12 wherein said labile-hydrogen segment is a phenol.

14. The melt processable polymer composition of claim 13 wherein said phenol is a bis-hydroquinone ester of isophthalic acid.

15. The melt-processable polymer composition of claim 12 wherein said labile-hydrogen segment is a polyol.

16. The melt-processable polymer composition of claim 15 wherein said polyol segment is a polycaprolactone diol.

17. The melt processable polymer composition of claim 16 wherein said polycaprolactone has a hydroxy equivalent weight of about 265.

18. The melt-processable polymer composition of claim 13 wherein said labile-hydrogen phenol segment is a polyimide.

19. The melt processable polymer composition of claim 18 wherein said polyimide is an oxydiphthalic anhydride coupled with 1,6-hexanediamine and end-capped with a 4-aminophenol.

20. The melt processable polymer composition of claim 18 wherein said polyimide is an oxydiphthalic anhydride coupled with 4,4'-oxydianiline and end-capped with a 4-aminophenol.

21. The melt processable polymer composition of claim 1 wherein said isocyanate segment is aromatic.

22. The melt processable polymer composition of claim 21 wherein said aromatic isocyanate is chosen from the group of aromatic isocyanates consisting of toluene diisocyanates, naphthalene diisocyanates, and phenyl diisocyanates.

23. The melt processable polymer composition of claim 21 wherein said isocyanate segment is a triisocyanate.

24. The melt processable polymer composition of claim 23 wherein said triisocyanate is formed in situ from a diisocyanate and a triol.

25. The melt processable polymer composition of claim 24 wherein said triol is trimethylpropane.

26. The melt-processable polymer composition of claim 1 wherein said isocyanate segment is an oligomer.

27. The melt-processable polymer composition of claim 1 wherein said segment having labile-hydrogen functionality is an oligomer.

28. The melt-processable polymer composition of claim 27 wherein said oligomer is a polycarbonate.

29. The melt-processable polymer composition of claim 28 wherein said polycarbonate oligomer is formed from bisphenol A and phosgene and has phenolic hydroxyl end groups.

30. The melt-processable polymer composition of claim 29 wherein said polycarbonate has a degree of polymerization of about nine.

31. The melt-processable polymer composition of claim 27 wherein said oligomer is an aromatic polyester.

32. The melt-processable polymer composition of claim 31 wherein said aromatic polyester is a bis-paraacetoxyphenyl ester of isophthalic acid with the acetate groups replaced by parahydroxybenzoate groups.

33. The melt-processable polymer composition of claim 32 wherein the degree of polymerization of said aromatic polyester is about three.

34. The melt-processable polymer composition of claim 31 wherein said aromatic polyester has liquid crystal property.

35. The melt-processable polymer composition of claim 27 wherein said oligomer is a polyphenylene sulfide oligomer.

36. The melt-processable polymer composition of claim 27 wherein said oligomer contains poly(parabanic acid) linkage.

37. The melt-processable polymer composition of claim 1 further comprising thermally-reversible ionic functionality.

38. The melt-processable polymer composition of claim 37 wherein said ionic functionality is zinc 4,4-bis(4,hydroxyphenol) valerate.

39. The melt-processable polymer composition of claim 1 wherein said compound with labile-hydrogen functionality is a prepolymer.

40. The melt-processable polymer composition of claim 39 wherein said prepolymer is selected from the group consisting of polycaprolactone diols, polytetramethylene ether glycols, polyaliphatic carbonate diols, hydroxy-ended aliphatic polyesters, and saturated hydroxy-ended phthalic acid-based polyesters.

41. A process for forming a melt-processable polymer composition comprising reacting a first compound with isocyanate functionality with a second compound with labile-hydrogen functionality to yield a polymer with a isocyanate-labile hydrogen backbone linkage that reversibly dissociates at above about 150° C. into said compounds with isocyanate and labile-hydrogen functionality and has a viscosity less than about 100,000 poise.

42. A method for using said polymer composition of claim 41 comprising:
  1) applying said polymer composition to a surface of first substrate; and
  2) pressing a second substrate in contact with said polymer composition on said first substrate.

43. A method of using the polymer composition of claim 42 further comprising heating at least one said substrate prior to said polymer composition application.

44. A method of using the polymer composition of claim 42 further comprising heating at least one said substrate after said polymer composition application.

45. A process for preparing a melt-processable polymer composition comprising:
  a. melting and mixing a high-melting compound with labile-hydrogen functionality with a low-melting compound with labile-hydrogen functionality to form a homogenous melt and
  b. adding to said homogeneous melt a compound with isocyanate functionality to yield a polymer with an isocyanate-labile hydrogen backbone linkage that reversibly dissociates at above about 150° C. into said compounds with isocyanate and labile-hydrogen functionality and a viscosity less than about 100,000 poise.

46. The process according to claim 45 further comprising the step of adding an additional compound with labile-hydrogen functionality selected from the group of compounds consisting of polycarbonates, polyimides, polyesters, polysulfides and compounds with poly(parabanic acid) linkage prior to the addition of said compound with isocyanate functionality.

47. The process according to claim 45 further comprising the step of adding an additional compound having labile-hydrogen and ionic functionality capable of forming thermally-reversible ionic bonds prior to the addition of said compound with isocyanate functionality.

48. The process according to claim 47 further comprising the step of adding an endcapping compound.

49. A polyester oligomer comprising a compound represented by the acronym sequence PH-[DHA-DAH]$_n$-DHA-PH were PH is a phenolic hydroxy acid ester segment, DHA is a difunctional segments selected from the group of difunctional segments consisting of aromatic diacid ester, aromatic dihydroxy, aromatic hydroxy and acid ester, aliphatic diacid ester, aliphatic dihydroxy, and aliphatic hydroxy and acid ester segments, DAH is selected from the group of difunctional aromatic segments consiting of aromatic diacid ester, dihydroxy, and acid ester and hydroxy segments with DAH and DHA being choosen so as to form an ester group, with PH being chosen to form an ester with the terminal group of the DHA-DAH sequence and n is about 1-20.

50. The polyester oligomer of claim 49 wherein said polyester oligomer melts at more than about 180° C.

51. The polyester oligomer of claim 49 where PH is formed from p-hydroxybenzoic acid.

52. The polyester oligomer of claim 49 where DHA is hydroquinone diacetate.

53. The polyester oligomer of claim 49 where DAH is isophthalic acid.

54. The polyester oligomer of claim 49 wherein said polyester oligomer has liquid crystal property.

55. A polyimide oligomer comprising a compound represented by the acronym sequence AP[DA/DAm]-$_n$DA/AP where AP is an aromatic amine phenol endcapper, DA is an aromatic dianhydride selected from the group of aromatic dianhydrides consisting of fused and unfused aromatic ring dianhydrides, and DAm is a diamine coupler selected from the group of aromatic diamines and aliphatic diamines and wherein each of the amine groups of DAm is linked to one of the anhydride group of a distinct dianhydride DA as an imide, the amine of the phenol endapper (AP) is linked to the end unit anhydride group of the dianhydride as an imide and n is about 1-20.

56. The polyimide oligomer of claim 55 wherein said polyimide oligomer melts at more than about 180° C.

57. The polyimide oligomer of claim 55 wherein said AP endcapper is 4-aminophenol.

58. The polyimide oligomer of claim 55 wherein said DAm coupler is oxydiphthalic dianhydride.

59. The polyimide oligomer of claim 55 wherein said DAm coupler is 1,6-hexanediamine.

60. The polyimide oligomer of claim 55 wherein said DAm coupler is 4,4'-oxydianiline.

61. The polyimide oligomer of claim 55 wherein said oligomer has liquid crystal property.

62. A polycarbonate oligomer comprising a compound represented by the acronym sequence DP1-C-[DP2-C]$_n$DP1 where DP1 is an aromatic diphenol, C is carbonate functionality, DP2 is selected from the group of diphenols consisting of aromatic diphenols that may be the same as DP1 and aromatic-aliphatic diphenols and wherein C is carbonate functionality derived from a carbonyl and the oxygen moiety on seperate phenol units and n is about 1-20.

63. The polycarbonate oligomer of claim 62 wherein said oligomer melts at above about 180° C.

64. The polycarbonate oligomer of claim 62 wherein said carbonyl is obtained from phosgene.

65. The polycarbonate oligomer of claim 62 wherein DP1 and DP2 are bisphenol A.

* * * * *

UNITED STATES PATENT AND TRADEMARK OFFICE
CERTIFICATE OF CORRECTION

PATENT NO. : 5,097,010                                      Page 1 of 2

DATED : March 17, 1992

INVENTOR(S) : Markle et al.

It is certified that error appears in the above-identified patent and that said Letters Patent is hereby corrected as shown below:

In the Abstract, line 10, "carbon" should read --carbonate--.
Column 3, line 7, after the word "as" insert --to--.
Column 5, line 66, "3.933,758" should read --3,933,758--.
Column 6, line 24, "polycaprolatone" should read --polycaprolactone--.
Column 7, line 16, "aliphtic" should read "aliphatic--;
        line 20, "HDA" should read --DAH--.
Table 1, column 11, Table 1 has been broken at column 11, line 14; it continues at column 11, line 56.
Table 3, columns 11-12, footnote (f), "232" should read --323--.
Table 5, column 13, Sample Number $J^{(f)}$ (first repetition), in the column under Maximum Load, $lbs^{(c)}$, "1857" should read --1875--.
Column 19, line 28, "thermometer" should read --thermometers--;
        line 29, "reation)" should read --reaction--;
        line 30, "temperature." should read --temperature).--;
        line 34, "abut" should read --about--.
Column 23, line 7, "an" should read --a--.
Column 24, line 2, "claim" should read --claim 1--;
        line 52, "trimethylpropane" should read --trimethylolpropane--.
Column 25, line 45, "first" should read --a first--.
Column 26, line 16, "were" should read --where--;
        line 17, "segments" should read --segment--;
        line 25, "choosen" should read --chosen--;
        line 49, "endapper" should read --endcapper--:

UNITED STATES PATENT AND TRADEMARK OFFICE
CERTIFICATE OF CORRECTION

PATENT NO. : 5,097,010

DATED : March 17, 1992

INVENTOR(S) : Richard A. Markle, et al.

It is certified that error appears in the above-indentified patent and that said Letters Patent is hereby corrected as shown below:

Column 26, line 57, "DAm" should read --DA--.

Signed and Sealed this

Eleventh Day of October, 1994

Attest:

BRUCE LEHMAN

*Attesting Officer*    *Commissioner of Patents and Trademarks*